US008860270B2

(12) United States Patent
Ueda

(10) Patent No.: US 8,860,270 B2
(45) Date of Patent: Oct. 14, 2014

(54) TRANSVERSE FLUX MACHINE AND VEHICLE

(75) Inventor: Yasuhito Ueda, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 350 days.

(21) Appl. No.: 13/232,520

(22) Filed: Sep. 14, 2011

(65) Prior Publication Data

US 2012/0249035 A1     Oct. 4, 2012

(30) Foreign Application Priority Data

Mar. 30, 2011   (JP) ............................... P2011-076417
Jul. 29, 2011   (JP) ............................... P2011-166843

(51) Int. Cl.
    *H02K 21/12*        (2006.01)

(52) U.S. Cl.
    USPC .................................................... 310/156.02

(58) Field of Classification Search
    USPC ................... 310/156.02, 156.03–156.07, 267
    See application file for complete search history.

(56) References Cited

U.S. PATENT DOCUMENTS

| | | | |
|---|---|---|---|
| 6,657,329 B2 | 12/2003 | Kastinger et al. | |
| 6,888,272 B2 * | 5/2005 | Kastinger | 310/49.08 |
| 7,830,057 B2 * | 11/2010 | Gieras | 310/156.02 |
| 2004/0251759 A1 * | 12/2004 | Hirzel | 310/114 |
| 2008/0211326 A1 * | 9/2008 | Kang et al. | 310/44 |
| 2008/0246362 A1 * | 10/2008 | Hirzel | 310/156.02 |

FOREIGN PATENT DOCUMENTS

| | | |
|---|---|---|
| DE | 3904516 C1 | 6/1990 |
| JP | 9-117117 | 5/1997 |
| JP | 11-506600 | 6/1999 |
| JP | A 2002-112513 | 4/2002 |
| JP | A 2007-312449 | 11/2007 |
| JP | 4085059 | 2/2008 |
| JP | A 2009-273214 | 11/2009 |

OTHER PUBLICATIONS

State Intellectual Property Office of the People's Republic of China, First Written Opinion, issued in Chinese application No. 201110273860.9, Dec. 25, 2013.
Japanese Patent Office, Notice of Reasons for Refusal, issued in Japanese application No. 2010-166843, Mar. 7, 2014.

* cited by examiner

*Primary Examiner* — Hanh Nguyen
(74) *Attorney, Agent, or Firm* — Finnegan, Henderson, Farabow, Garrett & Dunner, L.L.P.

(57) ABSTRACT

A transverse flux machine includes: a winding wound in a rotational direction; a stationary component in which first ferromagnets and second ferromagnets surrounding a part of the winding are arranged in the rotational direction; a rotor capable of rotating around a rotational axis; and a rotary component opposing the stationary component and attached to the rotor, wherein the rotary component having: third ferromagnets opposing the first ferromagnets; fourth ferromagnets opposing the second ferromagnets; and first magnetic field generating sections and second magnetic field generating sections intervened between the third ferromagnets and the fourth ferromagnets, wherein the first magnetic field generating sections and the second magnetic field generating sections generate magnetic fields from an opposing surface of the rotary component toward an opposing surface of the stationary component, and directions of the magnetic fields are opposite of one another.

14 Claims, 49 Drawing Sheets

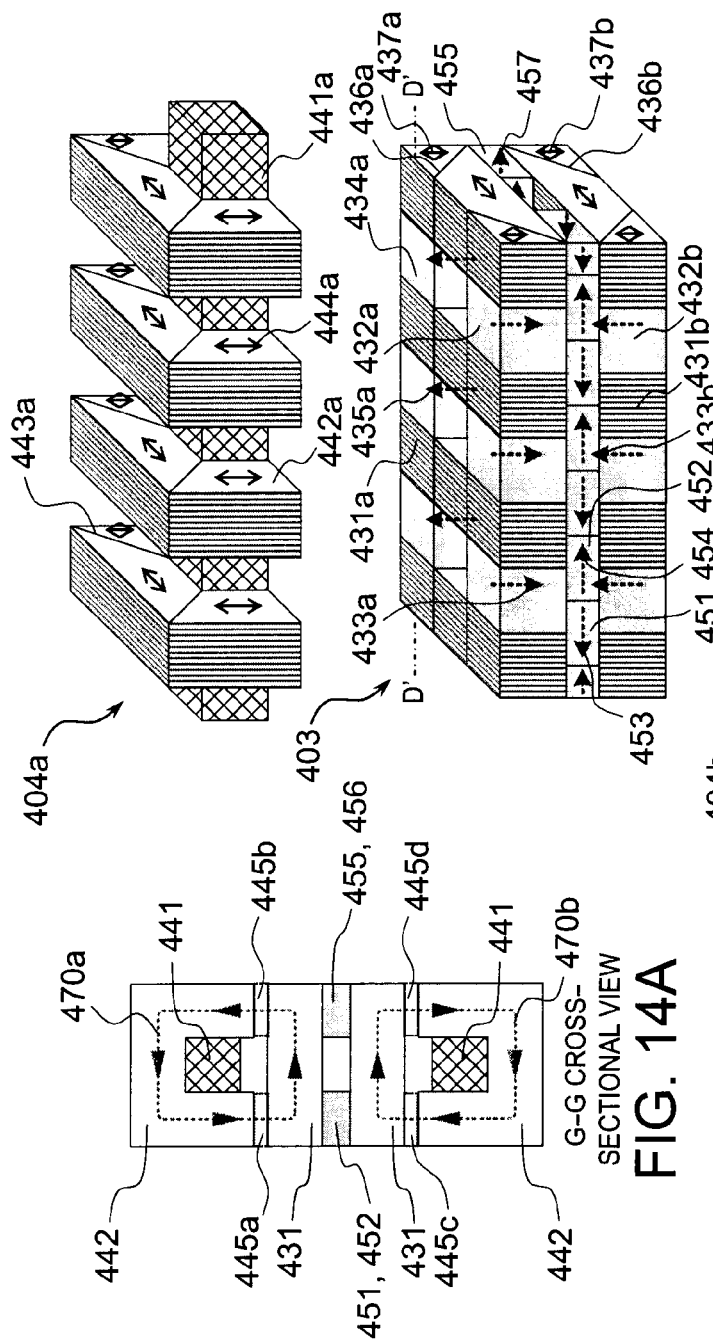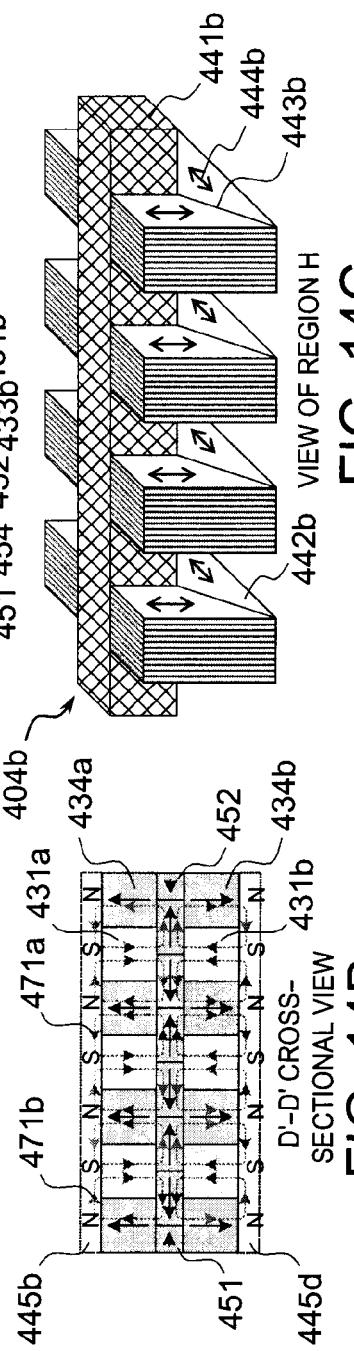
FIG. 14A G-G CROSS-SECTIONAL VIEW
FIG. 14B D'-D' CROSS-SECTIONAL VIEW
FIG. 14C VIEW OF REGION H

VIEW SEEN FROM ARROW C'''

A"-A" CROSS-SECTIONAL VIEW

B"-B" CROSS-SECTIONAL VIEW

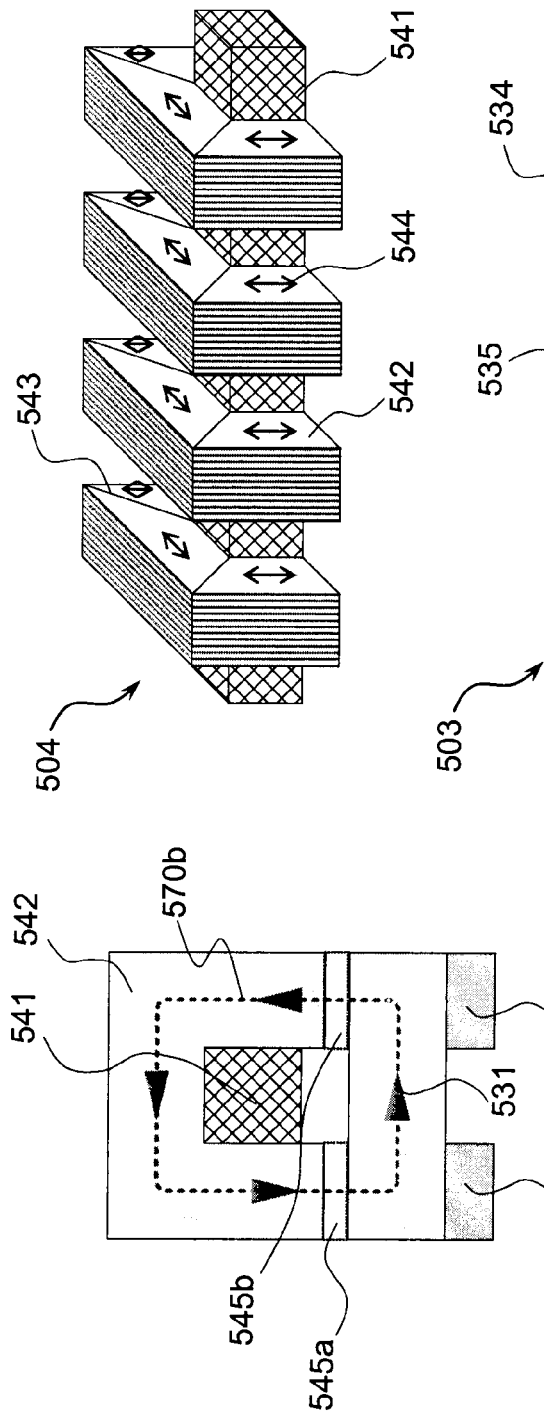
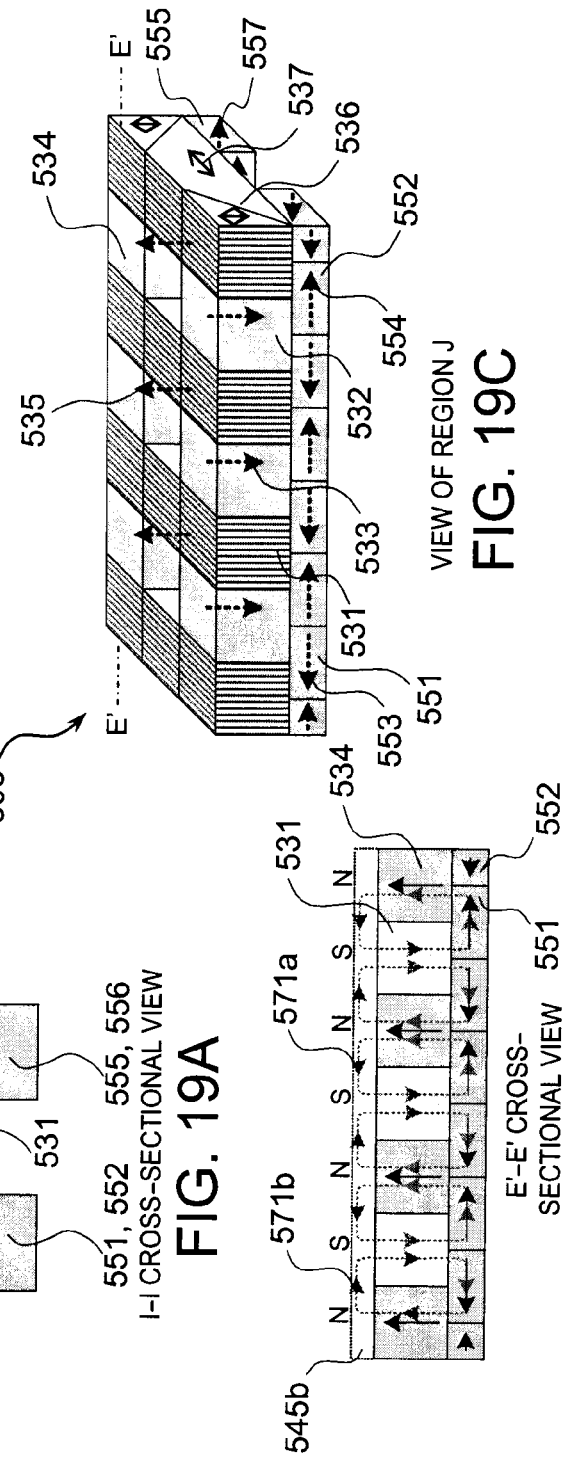
FIG. 19A I-I CROSS-SECTIONAL VIEW
FIG. 19B E'-E' CROSS-SECTIONAL VIEW
FIG. 19C VIEW OF REGION J

VIEW SEEN FROM ARROW F'''

E"-E" CROSS-SECTIONAL VIEW

A-A CROSS-SECTIONAL VIEW

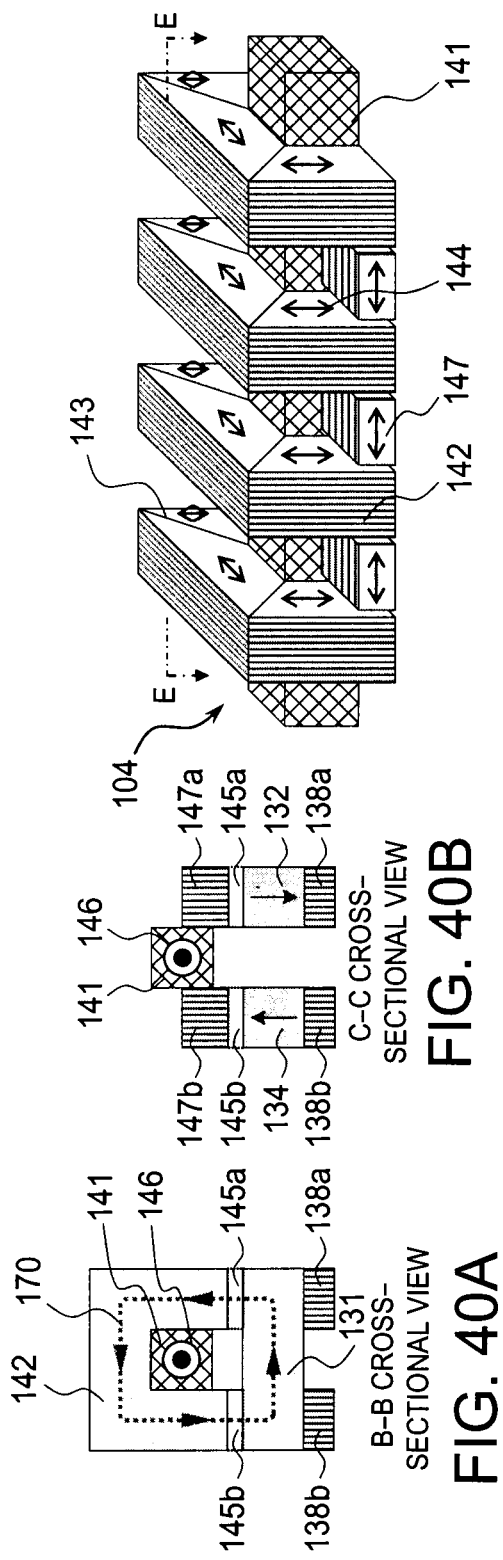
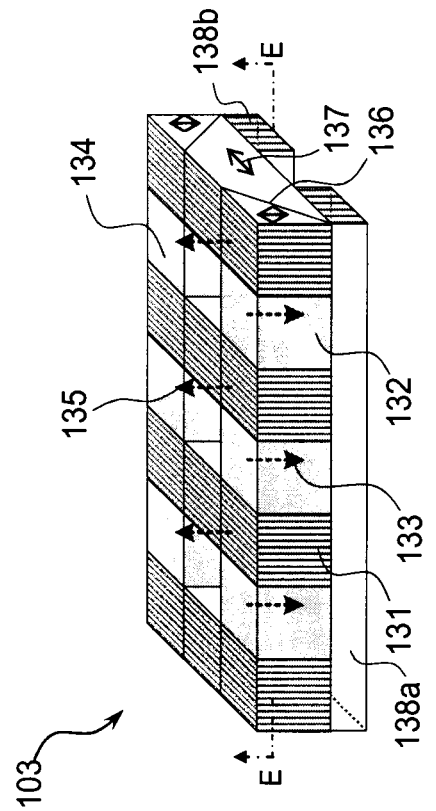
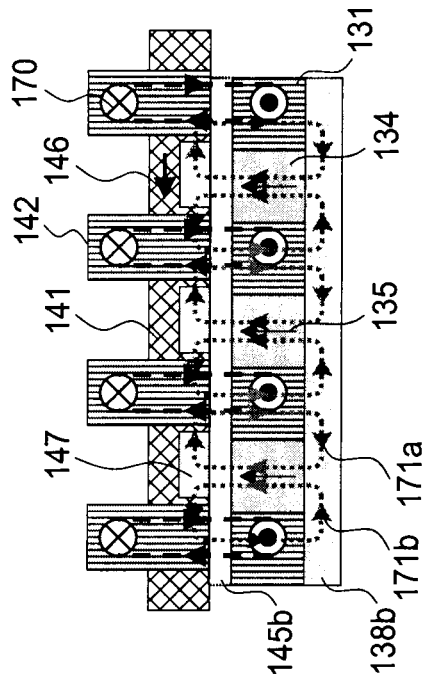
FIG. 40A  B-B CROSS-SECTIONAL VIEW
FIG. 40B  C-C CROSS-SECTIONAL VIEW
FIG. 40C  E-E CROSS-SECTIONAL VIEW
FIG. 40D  VIEW OF REGION D

A'-A' CROSS-SECTIONAL VIEW

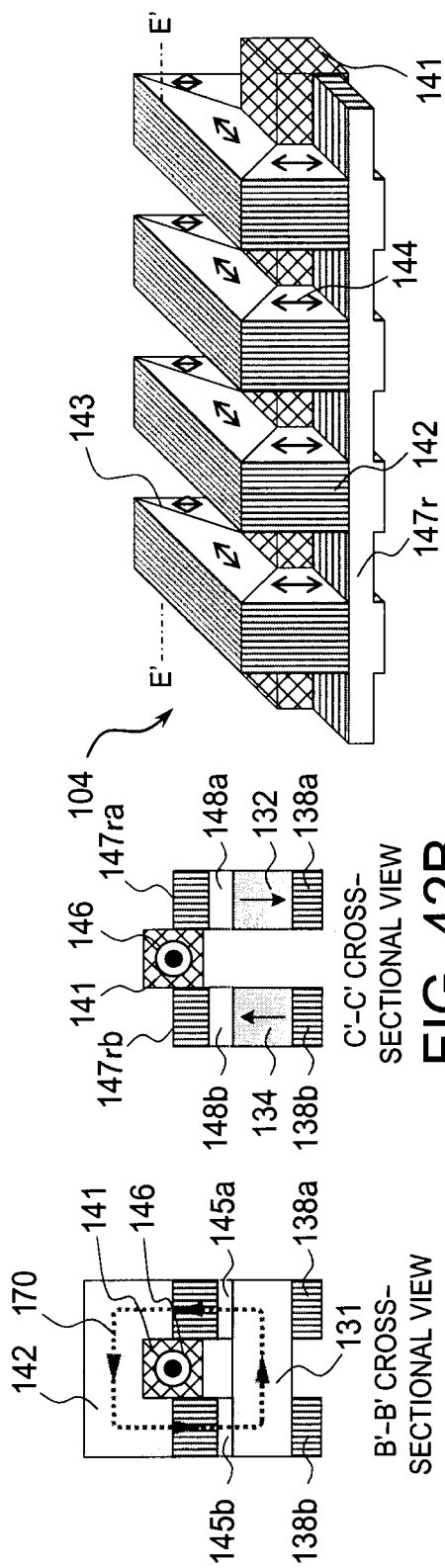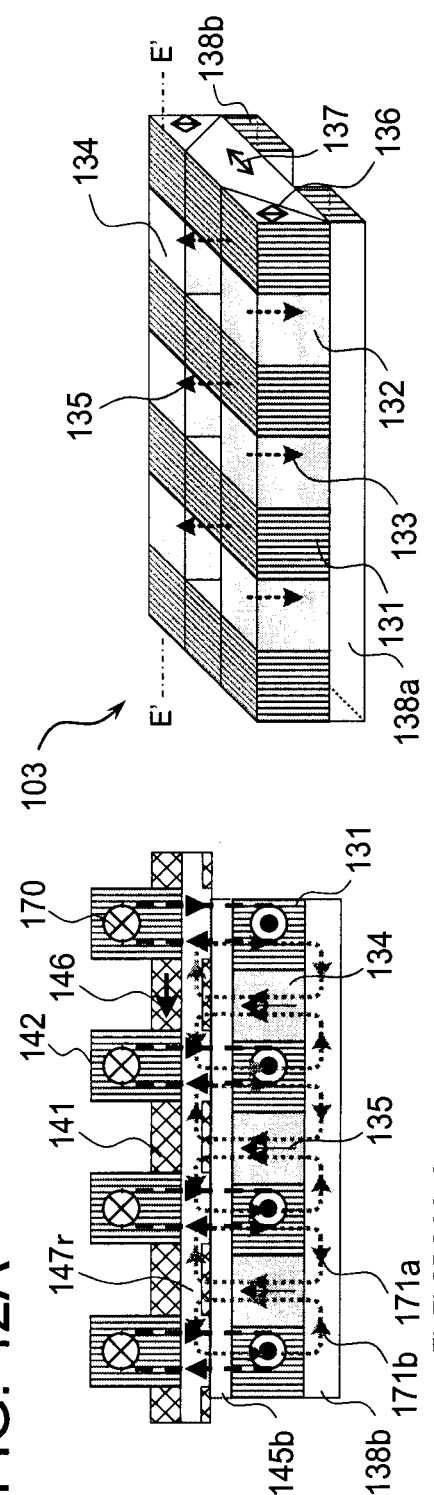

A"-A" CROSS-SECTIONAL VIEW

B"-B" CROSS-SECTIONAL VIEW

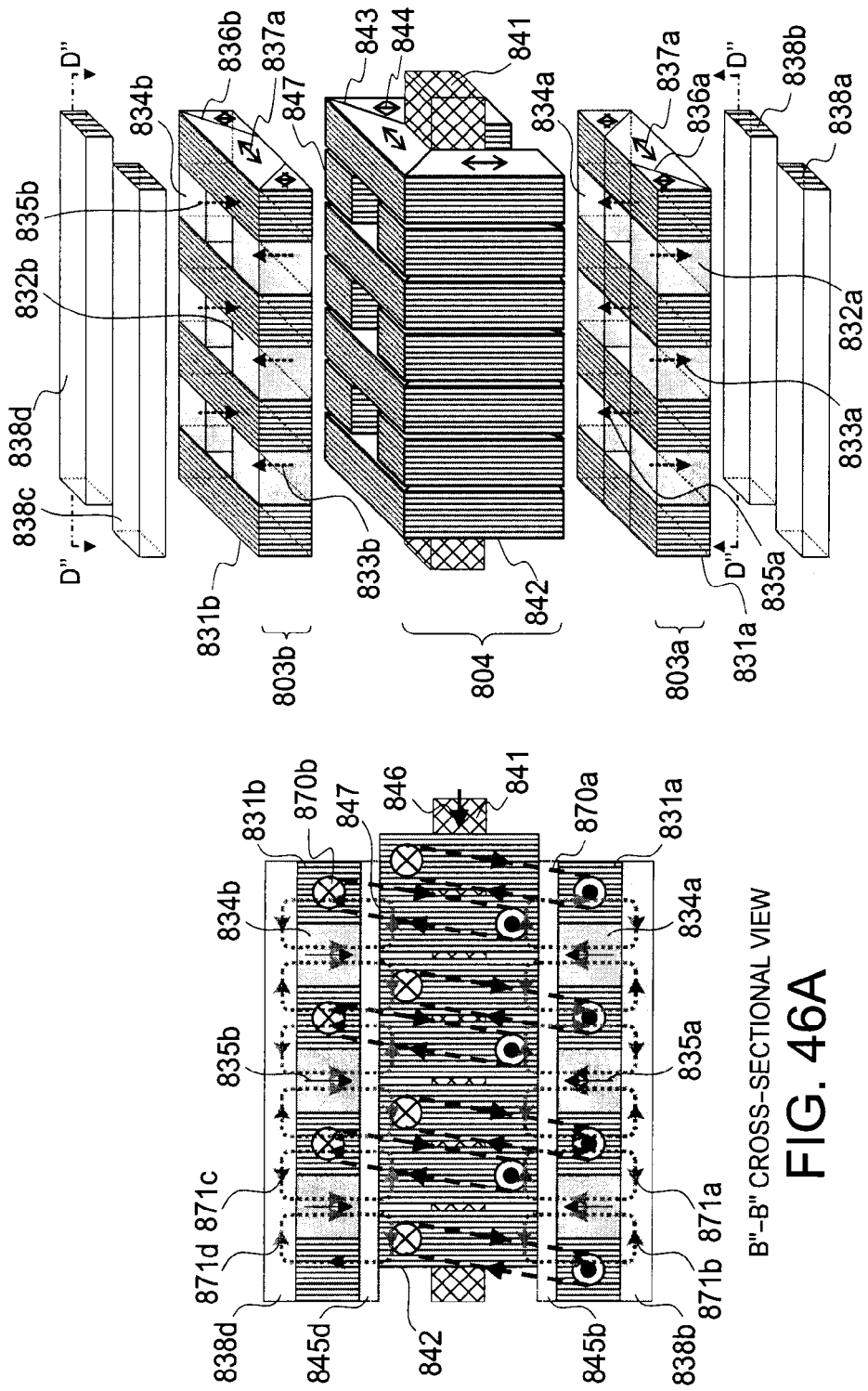

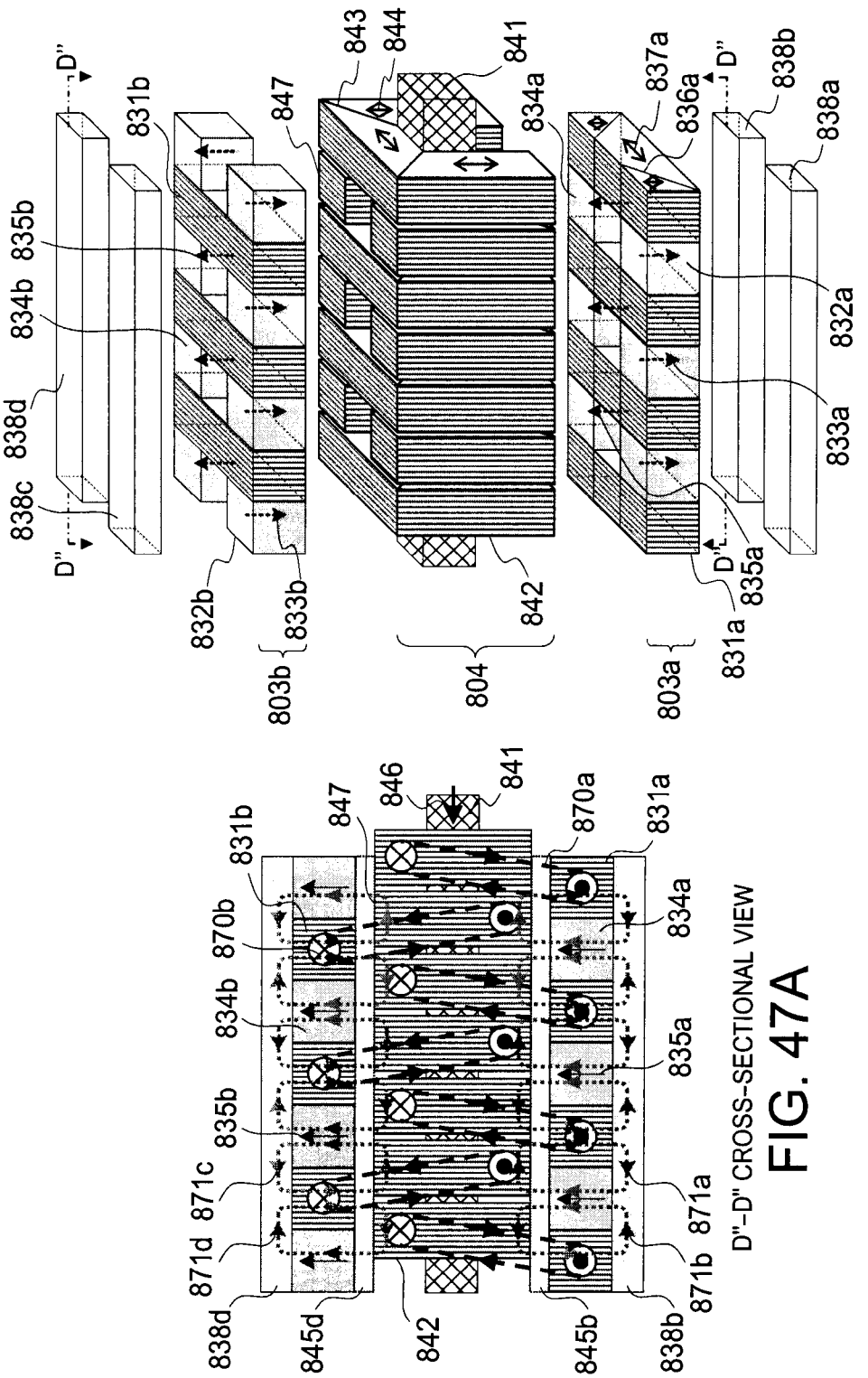

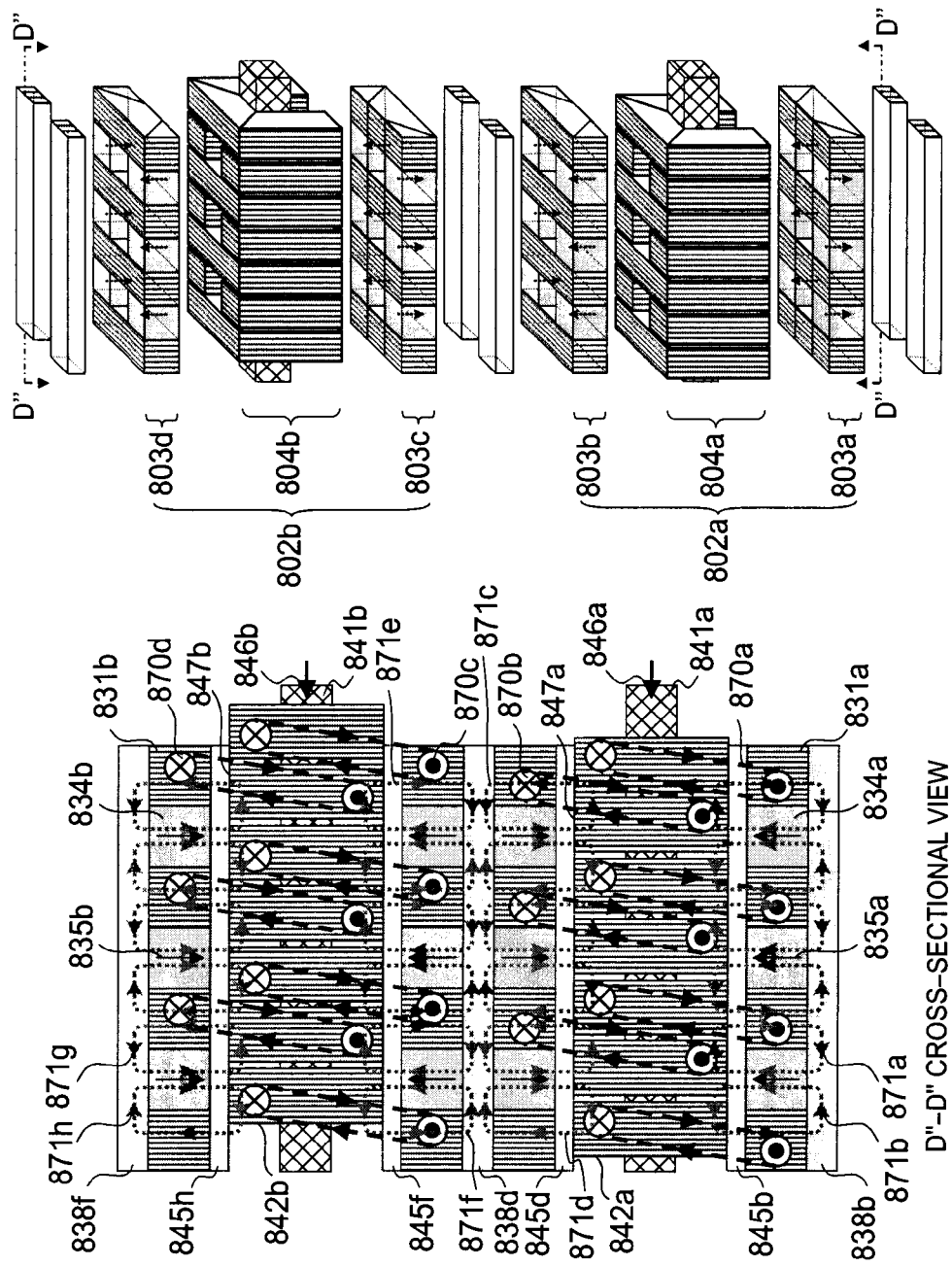
FIG. 48A D"-D" CROSS-SECTIONAL VIEW
FIG. 48B SERIALLY CONNECTING TWO DRIVING COMPONENTS 802

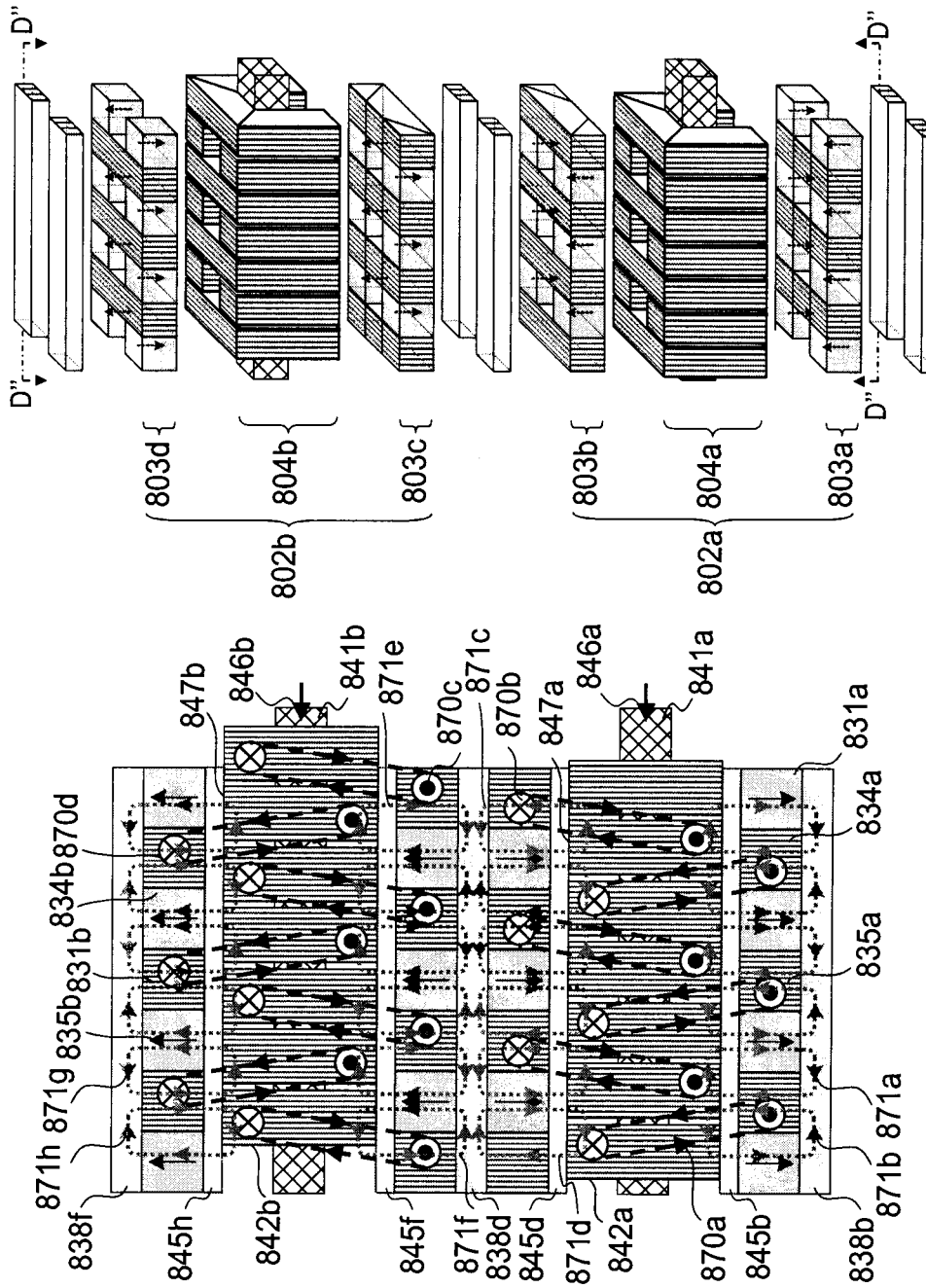

TRANSVERSE FLUX MACHINE AND VEHICLE

CROSS-REFERENCE TO RELATED APPLICATIONS

This application is based upon and claims the benefit of priority from the prior Japanese Patent Application No. 2011-076417, filed on Mar. 30, 2011, the entire contents of which are incorporated herein by reference. This application is also based upon and claims the benefit of priority from the prior Japanese Patent Application No. 2011-166843, filed on Jul. 29, 2011, the entire contents of which are incorporated herein by reference.

FIELD

Embodiments described herein generally relate to a transverse flux machine and a vehicle using the same.

BACKGROUND

In a transverse flux machine, a stator is configured of a circular coil wound coaxially with a rotor and a U-shaped magnet core surrounding the rotor and arranged on a circumference, and the rotor is configured of a permanent magnet arranged to oppose a magnetic polarity of the stator and a magnet core.

Two or more combinations exist in which a relative relationship of the stator and the rotor in a rotational direction differs, and torque is generated by supplying polyphase current to the circular coil of the stator of those combinations. In this structure, generally, it is easy to generate multipolarized magnetic fields, and high torque can be achieved thereby. As of today, transverse flux machines having a structure in which a salient pole is provided on the rotor magnet core have been proposed.

BRIEF DESCRIPTION OF THE DRAWINGS

FIGS. 14A and 14B are cross-sectional views along G-G of FIG. 13 and D'-D', and FIG. 14C is an enlarged view of a region H of FIG. 13;

FIGS. 19A and 19B are cross-sectional views along I-I of FIG. 16 and E'-E', and FIG. 19C is an enlarged view of a region J of FIG. 16;

FIGS. 40A to 40C are cross-sectional views along B-B, C-C and E-E of FIG. 39, and FIG. 40D is an enlarged view of a region D of FIG. 39;

FIGS. 42A to 42C are cross-sectional views along B'-B', C'-C' and E'-E' of FIG. 41, and FIG. 42D is an enlarged view of a region D' of FIG. 41;

FIG. 46A is a cross-sectional view along D"-D", and FIG. 46B is an enlarged view of a region C" of FIG. 44 and FIG. 45;

FIG. 47A is a cross-sectional views along D"-D", and FIG. 47B is the enlarged view of the region C" of FIG. 44 and FIG. 45;

FIG. 48A is a cross-sectional view along D"-D", and FIG. 48B is a configurational diagram of a case in which two pieces of the driving component 802 of FIG. 46 are serially connected; and FIG. 49A is a cross-sectional view along D"-D", and FIG. 49B is a configurational diagram of a case in which two pieces of the driving component 802 of FIG. 47 are serially connected.

DETAILED DESCRIPTION

In conventionally proposed transverse flux types, a path in which a magnetic flux flows is configured of a magnetic core, air and permanent magnets. The permanent magnets are necessary for generating a magnetic field on a rotor side, however, since permeance of the permanent magnet is low and equaling to that in the air, it is difficult to obtain high magnetic flux density.

In an aspect of one embodiment as shown below, a transverse flux machine realizing high power factor and high magnetic flux density and a vehicle using the same can be provided.

According to an aspect of a first embodiment, there is provided a transverse flux machine including: a winding wound in a rotational direction; a stationary component in which first ferromagnets and second ferromagnets surrounding apart of the winding are arranged in the rotational direction; a rotor capable of rotating around a rotational axis; and a rotary component opposing the stationary component and attached to the rotor, wherein the rotary component includes: third ferromagnets opposing the first ferromagnets; fourth ferromagnets opposing the second ferromagnets; and first magnetic field generating sections and second magnetic field generating sections intervened between the third ferromagnets and the fourth ferromagnets, wherein the first magnetic field generating sections and the second magnetic field generating sections generate magnetic fields from an opposing surface of the rotary component toward an opposing surface of the stationary component, and directions of the magnetic fields are opposite of one another.

According to an aspect of a second embodiment, a vehicle including the transverse flux machine of the first embodiment is provided.

Hereinbelow, embodiments will be explained in further detail with reference to the drawings.

First Embodiment

Hereinbelow, a rotary machine 1 of a first embodiment will be explained with reference to FIGS. 1 to 3 and FIGS. 25 to 34.

Figure 1:
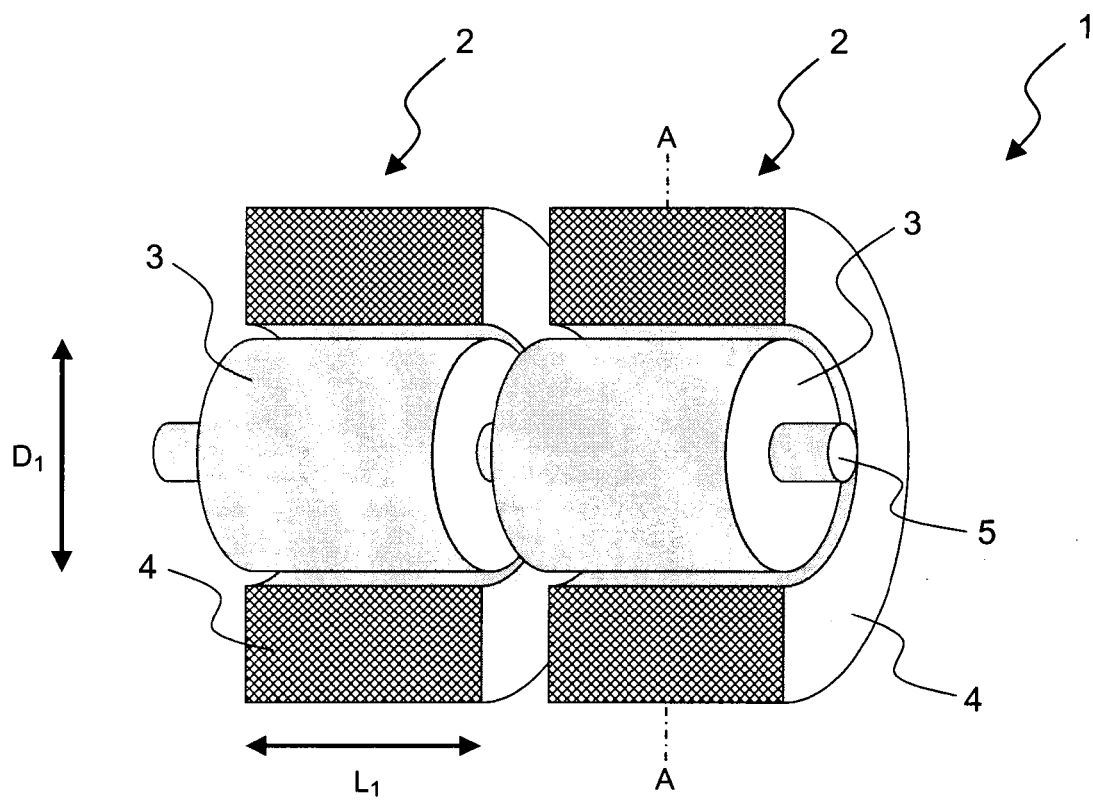
FIG. 1 is an overall view showing a configuration of a rotary machine according to a first embodiment.
Figure 2:
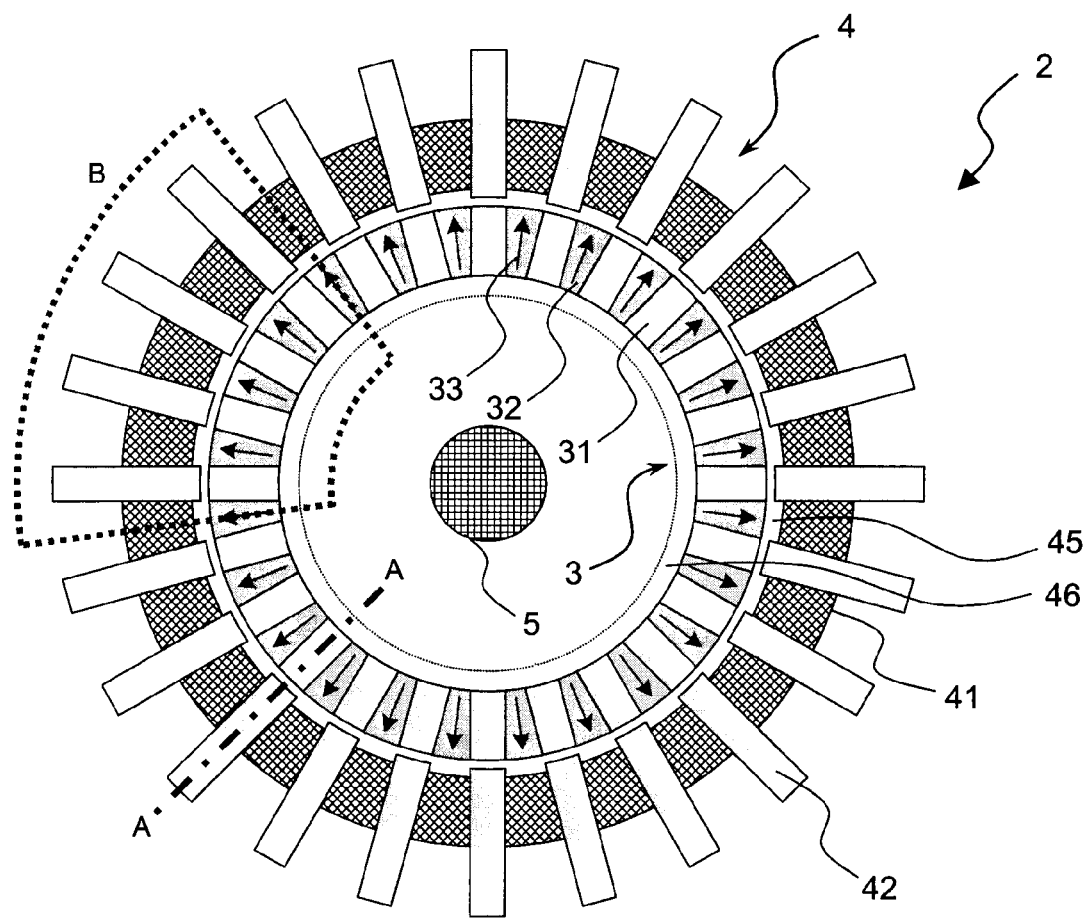
FIG. 2 is a cross-sectional view showing a configuration of a driving component 2 of FIG. 1.
Figure 3:
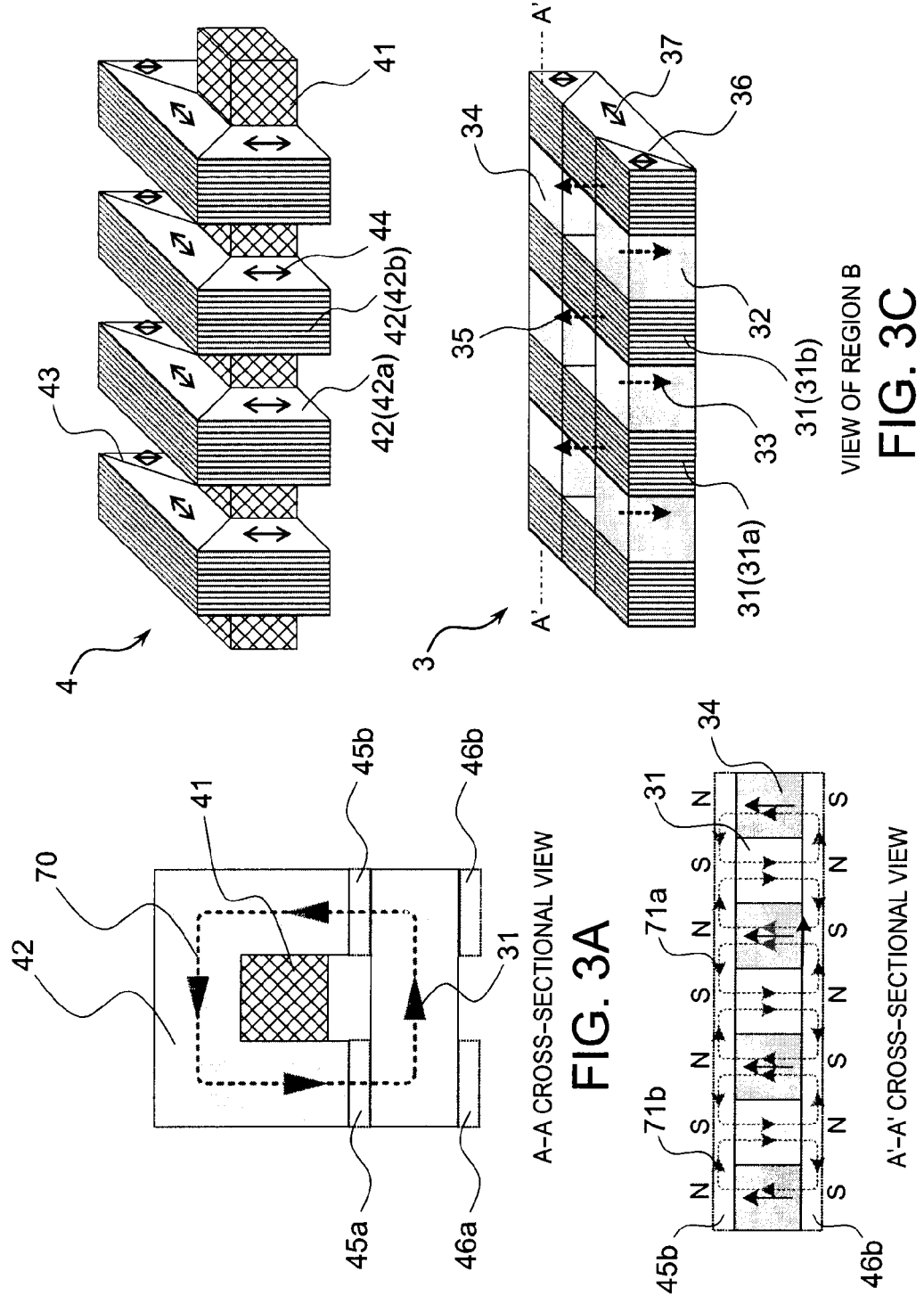
FIGS. 3A and 3B are cross-sectional views along A-A of FIG. 2 and A'-A'.
FIG. 3C is an enlarged view of a region B of FIG. 2.

FIGS. 1 to 3 are views for explaining a configuration of the rotary machine 1 of the present embodiment. Firstly, in FIG. 1, an overall view of the rotary machine 1 is shown. In the rotary machine 1, a plurality (two pieces in this embodiment) of driving components 2, each of which is configured of a rotary component 3 and a stationary component 4, is arranged in an axial direction, and the respective rotary components 3 are joined by a rotational axis 5. FIG. 2 shows a cross section of the driving component 2. FIG. 3 shows a cross-sectional view along A-A and an enlarged view of a region B of FIG. 2. In the driving component 2, the rotary component 3 and the stationary component 4 are opposing via a gap 45 in a radial direction. Understandably, the rotary machine 1 has the rotary component 3 to rotate around the rotational axis, however, the below explanations regarding the drawings explain examples of occasions when the rotary component 3 and the stationary component 4 are in the states as shown in the respective drawings.

The rotary component 3 is configured of ferromagnets 31 (third ferromagnets 31a, fourth ferromagnets 31b) and magnetic field generating sections 32, 34 that generate magnetic fields in opposite directions in the radial direction. Note that, magnetizing directions 33, 35 respectively indicate the directions of the magnetic fields generated by the magnetic field generating sections 32, 34. By this type of structure of the rotary component 3, magnetic fields in different directions are generated in the magnetic field generating section 32 (34) and the ferromagnets 31 relative to a circumferential direction, and directions of magnetic fields in gaps 45a and 45b become inverted.

On the other hand, the stationary component 4 is configured of a winding 41 and ferromagnets 42 surrounding a part of the winding 41. The ferromagnets 42 (first ferromagnets 42a, second ferromagnets 42b) have easy magnetizing axes 44, and as shown with dividing lines 43, by combining block constructions, a satisfactory magnetic property as anisotropic ferromagnets can be utilized.

Here, note that there is no need to employ the block constructions in a case of using non-anisotropic ferromagnets as the ferromagnets 42. By exciting the winding 41, the magnetic flux flows in the ferromagnets 31 and the ferromagnets 42 surrounding the winding 41, which interact with the magnetic fields generated by the magnetic field generating sections 32, 34, and as a result, torque is generated.

The rotary machine 1 includes at least two types of the driving components 2 in which a relative phase of the rotary component 3 and the stationary component 4 in a rotational direction differ. Due to this, the torque can be controlled by modulating the proportion of the amount of current to be supplied to the windings 41 of the plurality of driving components 2. For example, if the rotary machine 1 includes two driving components 2, the torque can be controlled by adapting two-phase current to the two windings 41. In the first embodiment, since the path of the magnetic flux by the excitation of the windings 41 is consisting of the ferromagnets and the gaps, the permeance thereof is high, and strong magnetic fields can be generated in a gap section by magnetomotive force of the same winding 41. Further, in the first embodiment, since the rotary component 3 and the stationary component 4 both have a magnetic flux source, a high power factor can be obtained in the rotary machine 1.

FIGS. 25 to 32 are diagrams showing a relationship of the driving force and the directions of the currents in the rotary machine 1. The current of the winding 41 necessary for empowering the rotary component 3 with a predetermined driving force differs depending on a rotational angle $f_r$ of the rotary component 3. Here, in FIGS. 25 to 28, the relationship of directions of the currents $I_a$, $I_b$ of the windings 41a, 41b that are necessary to empower the rotary component 3 with rightward driving force, and magnetization of the ferromagnets 42a, 42b at that time (being N-pole or S-pole) are shown. Note that, the relationship of the rotational angle $f_r$ of the rotary component 3 and an angle position $f_s$ of one ferromagnets 42a of the stationary component 4 is $f_s-p/2<f_r<f_s$ in FIG. 25, $f_s<f_r<f_s+p/2$ in FIG. 26, $f_s+p/2<f_r<f_s+p$ in FIG. 27, and $f_s-p<f_r<f_s-p/2$ in FIG. 28. Further, in FIGS. 29 to 32, the relationship of directions of the currents $I_a$, $I_b$ of the windings 41a, 41b that are necessary to empower the rotary component 3 with leftward driving force, and magnetization of the ferromagnets 42a, 42b at that time (being N-pole or S-pole) are shown. Note that, $f_s-p/2<f_r<f_s$ in FIG. 29, $f_s<f_r<f_s+p/2$ in FIG. 30, $f_s+p/2<f_r<f_s+p$ in FIG. 31, and $f_s-p<f_r<f_s-p/2$ in FIG. 32.

Figure 33:
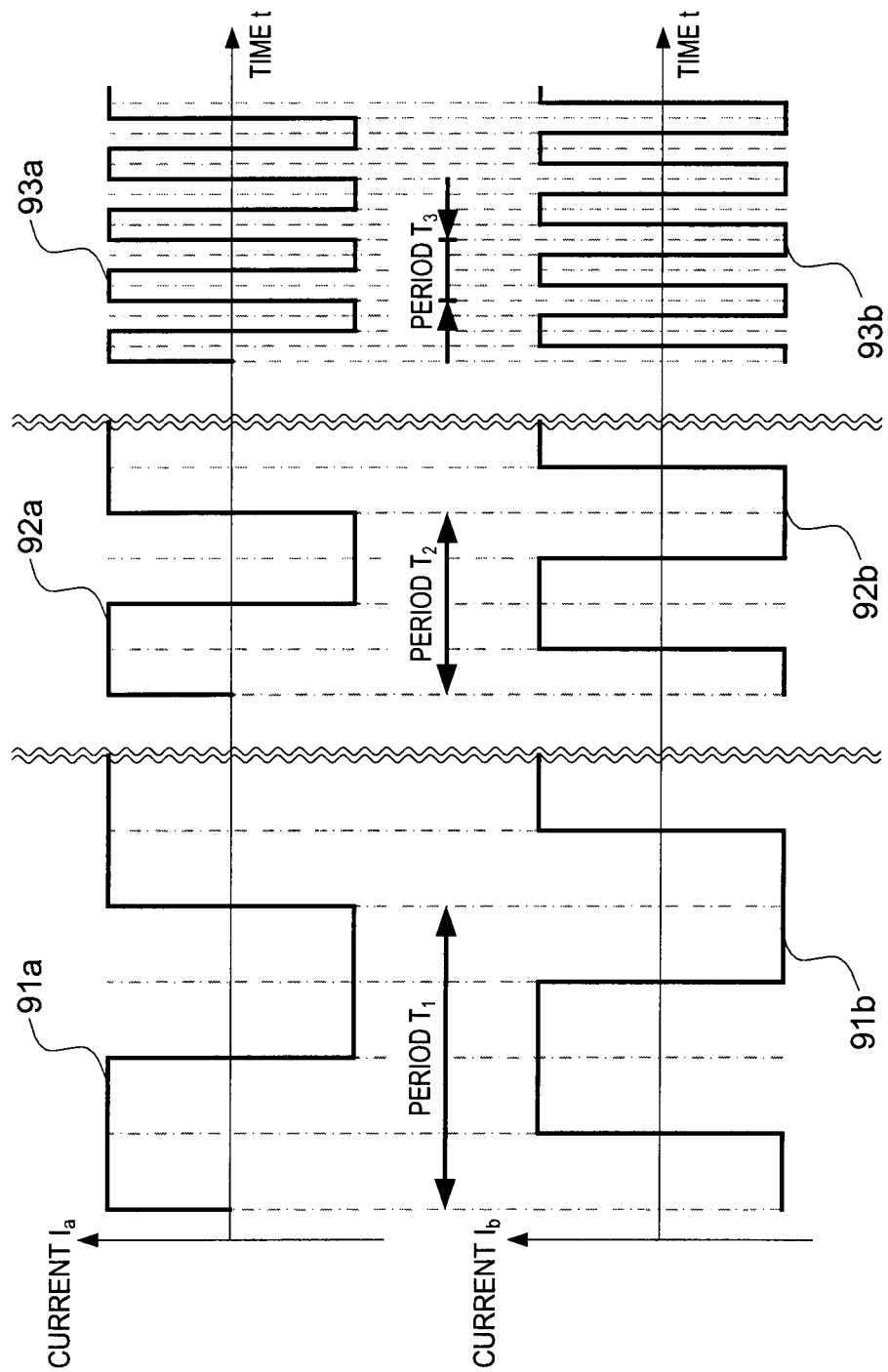
FIG. 33 is a diagram showing the current and time upon acceleration of the rotary machine 1 according to the first embodiment.
Figure 34:
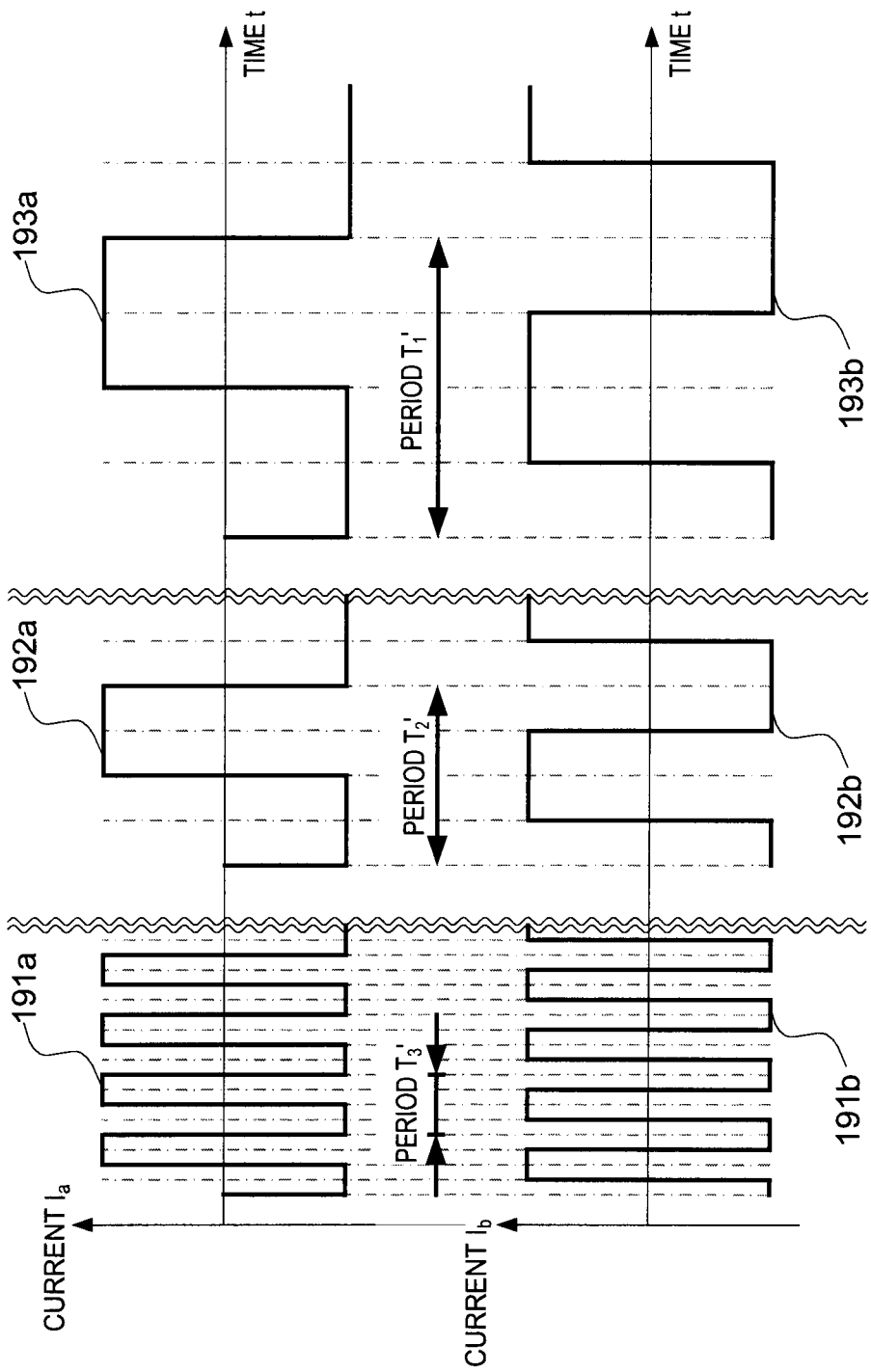
FIG. 34 is a diagram showing the current and time upon moderation of the rotary machine 1 according to the first embodiment.

Here, the rotary machine 1 includes two driving components 2, and the ferromagnets 31 and the magnetic field generating sections 34 (32) of the rotary component 3 and the ferromagnets 42 of the stationary component 4 are arranged at an interval of 2t relative to the rotational direction (progressing direction). Further, the two sets of the rotary components 3 are arranged so as to have the same phase relative to the rotational direction, and the two sets of the stationary components 4 are arranged so as to have a phase difference of 90° in the rotational direction (corresponding to an offset amount of t/2). In FIGS. 25 to 32, in order to empower the rotary component 3 with the driving force, appropriate currents $I_a$, $I_b$ need to be supplied to the windings 41a, 41b respectively in accordance with the rotational angles $f_r$ of the rotary components 3. Due to this, in the first embodiment, a sensor 84 that measures the rotational angle $f_r$ of the rotary component 3 and a controller 83 that receives signals from the sensor 84 and controls the current in the winding 41 are necessary. 82a and 82b of FIGS. 25 to 28 show the directions of the currents $I_a$, $I_b$ necessary for empowering the rightward driving force 81, 181, 281, 381 to the rotary components 3, and 82a and 82b of FIGS. 29 to 32 show the directions of the currents $I_a$, $I_b$ necessary for empowering the leftward driving force 481, 581, 681, 781 to the rotary components 3. In order to accelerate rightward in FIGS. 25 to 28, the currents 82a and 82b need to supply e.g. alternate current as shown in FIG. 33. The current $I_a$ has a phase that is advanced than that of the current $I_b$ by 90°, and the cycle T is shortened (frequency is increased) as the time elapses. This is due to an amount of positional change of the rotary component 3 per time units being increased as the acceleration time is elongated, and the directions of the currents need to be changed quickly in accordance therewith. On the other hand, in order to moderate the rightward movement as in FIGS. 29 to 32, the currents 82a and 82b need to supply e.g. alternate current as shown in FIG. 34. The current waveform $I_a$ has a phase that is delayed than that of the current waveform $I_b$ by 90°, and the cycle T' is elongated (frequency is lowered) as the time elapses. This is due to the amount of positional change of the rotary component 3 per time units being decreased as the moderation time is elongated, and the directions of the currents need to be changed slowly in accordance therewith. Here, the current waveforms 91, 92, 93, 191, 192 and 193 are exemplified as short waves, however, the same applies to other various alternate currents, such as sine waves. Further, in the case of having a plurality of sets of the driving components 2, the driving control of the rotary components 3 can similarly be realized by adapting polyphase currents to the windings 41 that are provided in the same number as the driving components 2.

Operations of the First Embodiment

Operations in generating torque in the first embodiment will be explained.

Firstly, by causing the excitation by applying the current in the winding 41, the magnetic flux flows in a path of the ferromagnet 42, the gap 45a, the ferromagnet 31, the gap 45b, and the ferromagnet 42 that are provided around the winding 41, and a magnetic circulation path 70 that is parallel to the radial direction and the axial direction is formed. On the other hand, the flux of the magnetic field generating section 32 (34) flows in a path of the magnetic field generating section 32 (34), the gap 45a (45b), the ferromagnet 42, the gap 45a (45b), the ferromagnet 31, gap 46a (46b), and the magnetic field generating section 32 (34), and a magnetic circulation path 71 that is parallel to the radial direction and the circumferential direction is formed. At this time, in the path of the ferromagnet 42, the gap 45a (45b) and the ferromagnet 31, the excitation in the winding 41 and the flux of the magnetic field generating section 32 (34) interact with one another, and as a result, torque is generated in the rotary component 3. Further, since there are plural sets of the rotary component 3 and the stationary component 4 opposing one another, and there are plural sets in which the relative phase of the rotary component 3 and the stationary component 4 in the rotational direction differs, the torque control at the respective positions becomes possible by modulating the current in the winding 41 of said sets. Further, by combining the easy magnetizing axes 37 (44) of the ferromagnets 31 (42) with the magnetic flux paths, a magnetic flux density that is higher than an isotropic ferromagnet is obtained, and an iron loss can be reduced.

Second Embodiment

Figure 4:
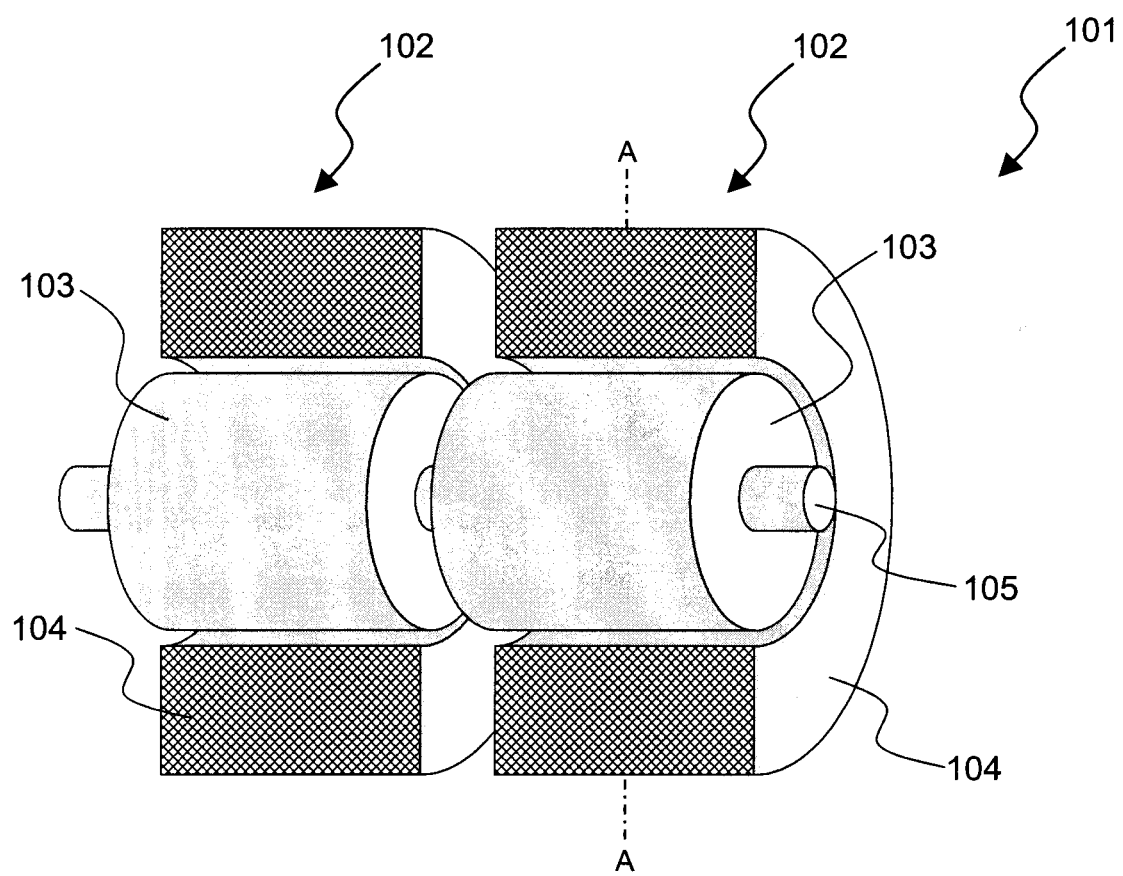
FIG. 4 is an overall view showing a configuration of a rotary machine 101 according to a second embodiment.
Figure 5:
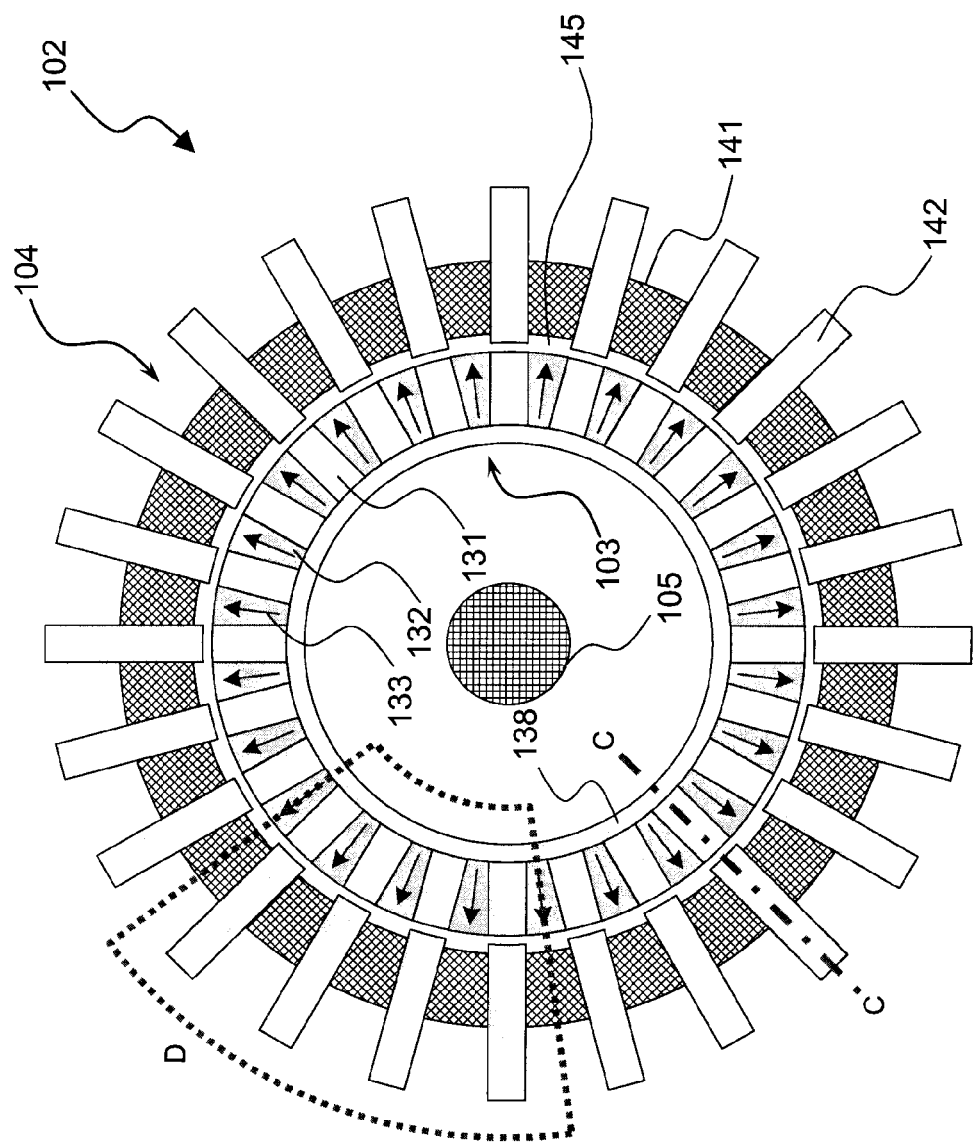
FIG. 5 is a cross-sectional view showing a configuration of a driving component 102 of FIG. 4.
Figure 6:
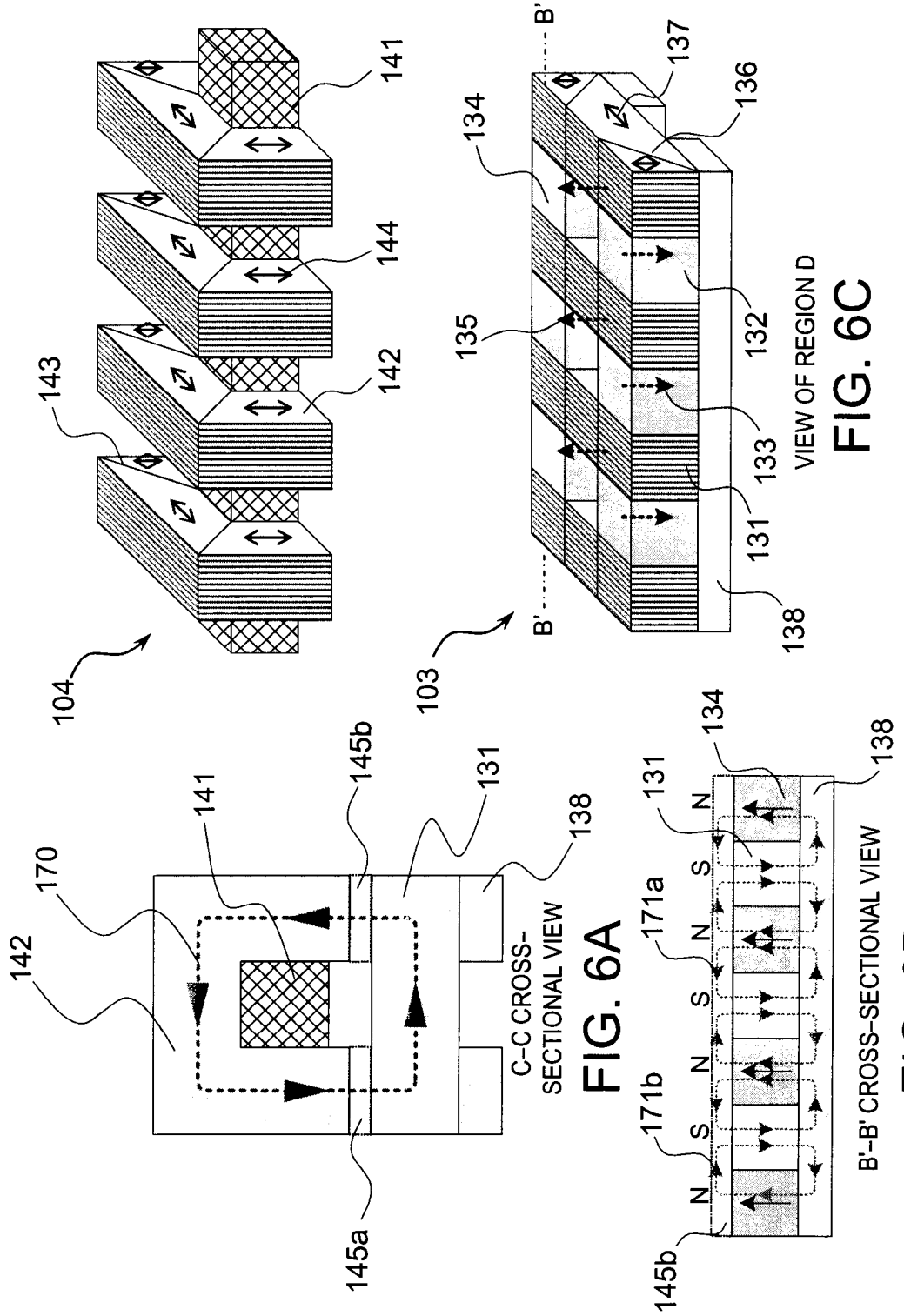
FIGS. 6A and 6B are cross-sectional views along C-C of FIG. 5 and B'-B'.
FIG. 6C is an enlarged view of a region D of FIG. 5.

FIGS. 4 to 6 are views for explaining a configuration of a rotary machine 101 of a second embodiment.

Although the basic configuration is the same as the rotary machine 1 as aforementioned, it differs in that a ferromagnet 138 is attached to a surface of a rotary component 103 not opposing a stationary component 104. According to this configuration, flux of magnetic field generating sections 132 (134) flows in paths of the magnetic field generating section 132 (134), a gap 145a (145b), a ferromagnet 142, the gap 145a (145b), a ferromagnet 131, the ferromagnet 138, and the magnetic field generating section 132 (134), and magnetic circulation paths 171 that are parallel to the radial direction and the circumferential direction are formed. Different from the first embodiment, upon the flux of the magnetic field generating section 132 (134) proceeding from the ferromagnet 131 to the magnetic field generating section 132 (134), since the magnetic flux does not pass through a gap 46a (46b) but passes through the ferromagnet 138 having high permeance, strong magnetic fields can be generated in the gap 145a (145b) even if the magnetic field generating sections 132 (134) have the same magnetomotive force.

Third Embodiment

Figure 7:
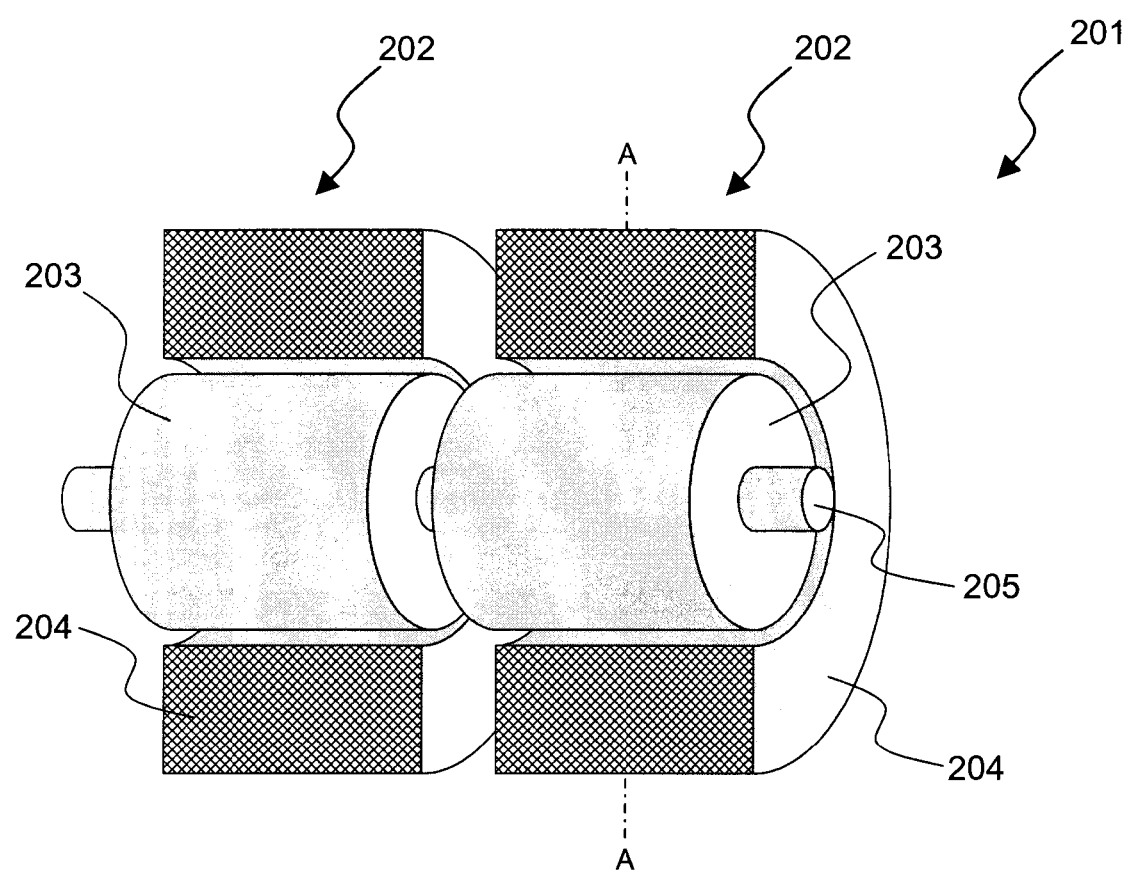
FIG. 7 is an overall view showing a configuration of a rotary machine 201 according to a third embodiment.
Figure 8:
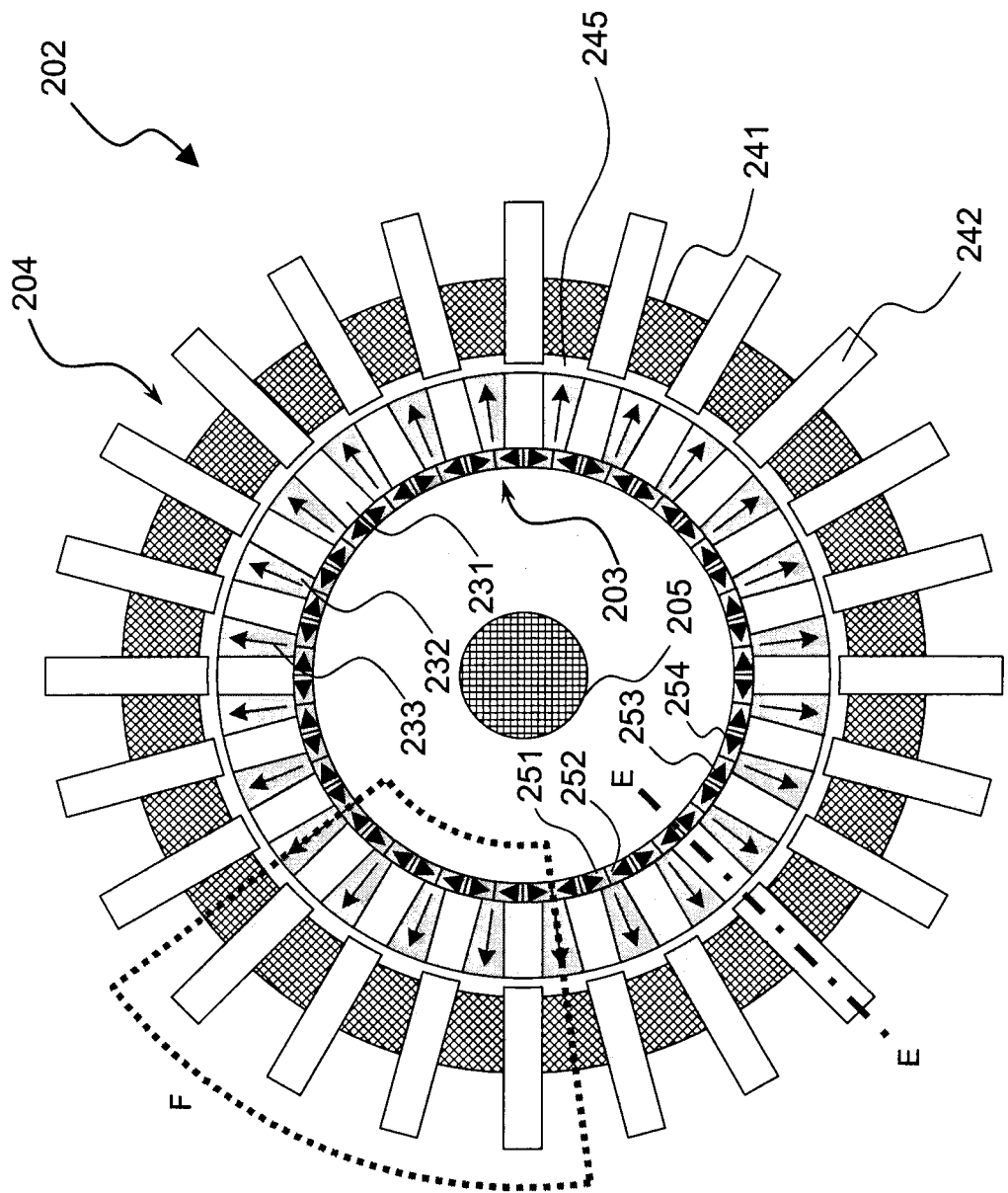
FIG. 8 is a cross-sectional view showing a configuration of a driving component 202 of FIG. 7.
Figure 9:
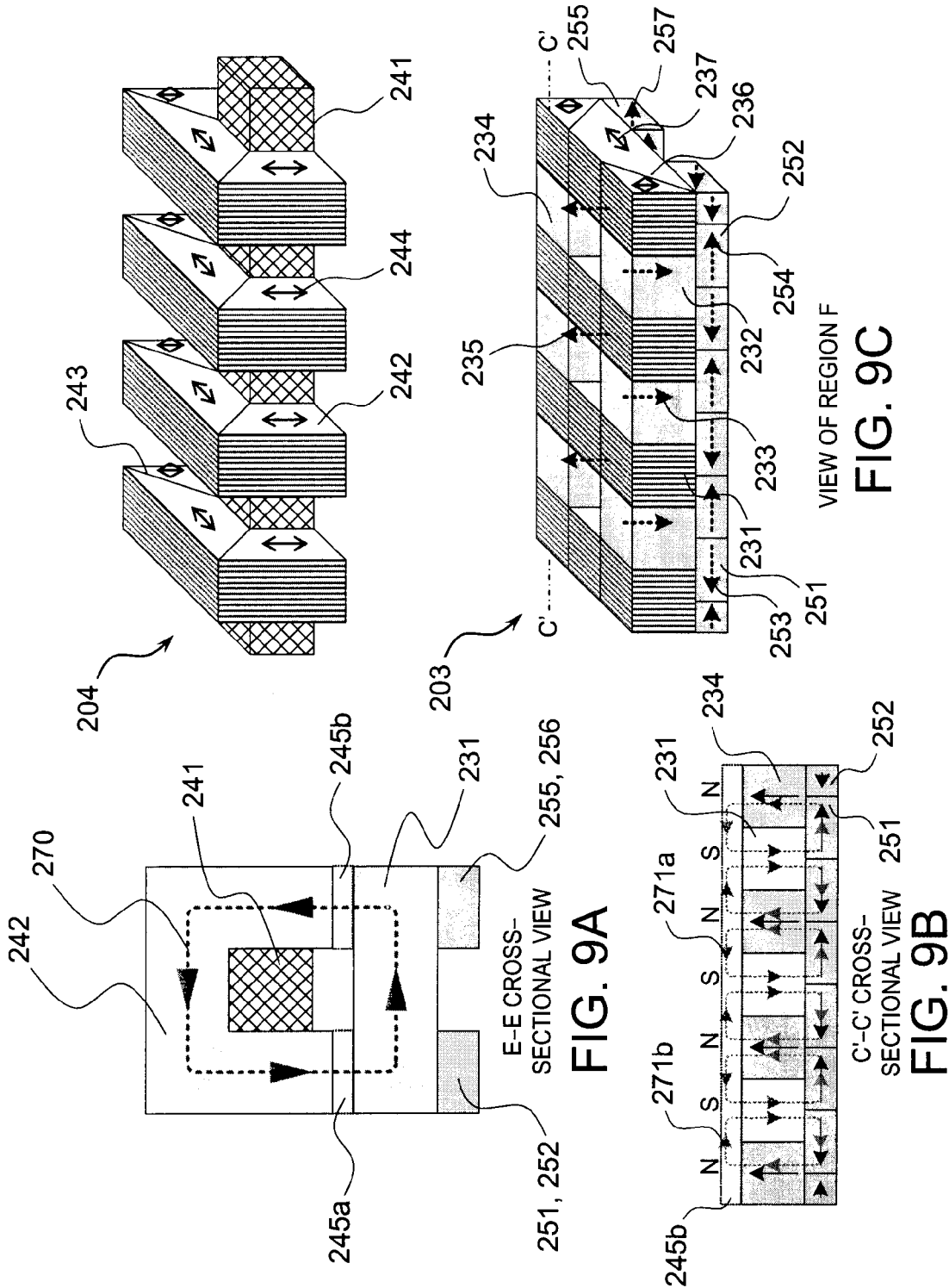
FIGS. 9A and 9B are cross-sectional views along E-E of FIG. 8 and C'-C'.
FIG. 9C is an enlarged view of a region F of FIG. 8.

FIGS. 7 to 9 are views for explaining a configuration of a rotary machine 201 of a third embodiment.

Although the basic configuration is the same as the rotary machine 1 as aforementioned, it differs in that magnetic field generating sections 251, 252 (255, 256) that strengthen magnetic fields inside ferromagnets 231 are attached to a surface of a rotary component 203 not opposing a stationary component 204. In the third embodiment, the magnetic field generating sections 251, 252 (255, 256) are configured to generate magnetic fields that are opposite to one another and parallel to the rotational direction. According to this configuration, flux of magnetic field generating section 232 (234) flows in paths of the magnetic field generating section 232 (234), a gap 245a (245b), a ferromagnet 242, the gap 245a (245b), the ferromagnet 231, the magnetic field generating sections 251, 252 (255, 256), and the magnetic field generating section 232 (234), and magnetic circulation paths 271 that are parallel to the radial direction and the circumferential direction are formed. Different from the first embodiment, upon proceeding from the ferromagnet 231 to the magnetic field generating section 232 (234), since the magnetic field generating sections 251, 252 (255, 256) are provided at positions corresponding to the gap 46a (46b), thereby the magnetic force is strengthened. In a case of using permanent magnets as the magnetic field generating sections, although permeance is generally equal to the gap, due to the aforementioned strengthening of the magnetic force, strong magnetic fields can be generated at a gap section in the gap 245a (245b) between the rotary component 203 and the stationary component 204.

Fourth Embodiment

Figure 10:
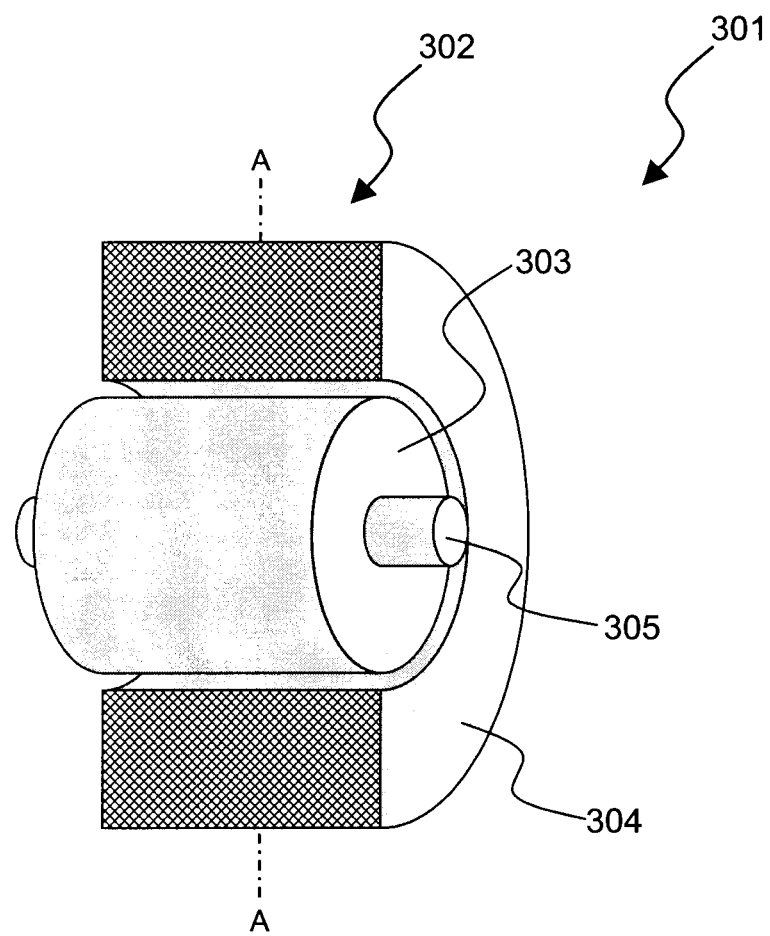
FIG. 10 is an overall view showing a configuration of a rotary machine 301 according to a fourth embodiment.
Figure 11:
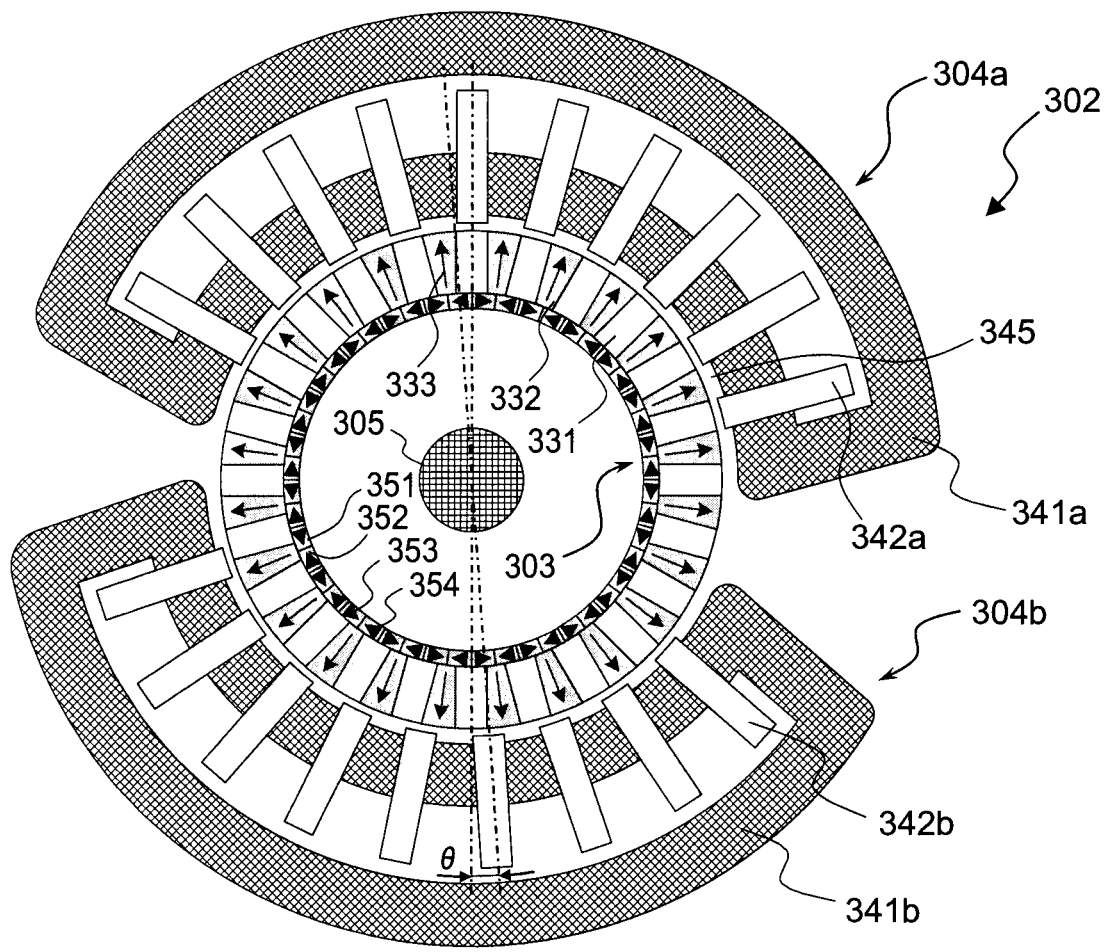
FIG. 11 is a cross-sectional view showing a configuration of a driving component 302 of FIG. 10.

FIGS. 10 and 11 are views for explaining a configuration of a rotary machine 301 of a fourth embodiment. Although the basic configuration is the same as the rotary machine 201 as aforementioned, it differs in that ferromagnets 342 are not provided at equal intervals on an entire circumference of a rotary component 303 in the circumferential direction, and in that it includes a plurality of windings 341 not wound around the entire circumference. Here, two sets of winding 341 are used, and ferromagnets 342a and 342b surrounded by the windings 341 are provided at equal intervals in the circumferential direction, however, the ferromagnets 342a are arranged offset in the circumferential direction from the ferromagnets 342b by an angle q. Due to this, the relative phase of a set of a stationary component 304a and the rotary component 303 and a set of a stationary component 304b and the rotary component 303 in the rotational direction differs, and the torque can be controlled by modulating the proportion of current to be provided to the windings 341 of a plurality of driving components 302. In this case, the torque can be controlled by adapting the two-phase current to the windings 341a and 341b.

Fifth Embodiment

Figure 12:
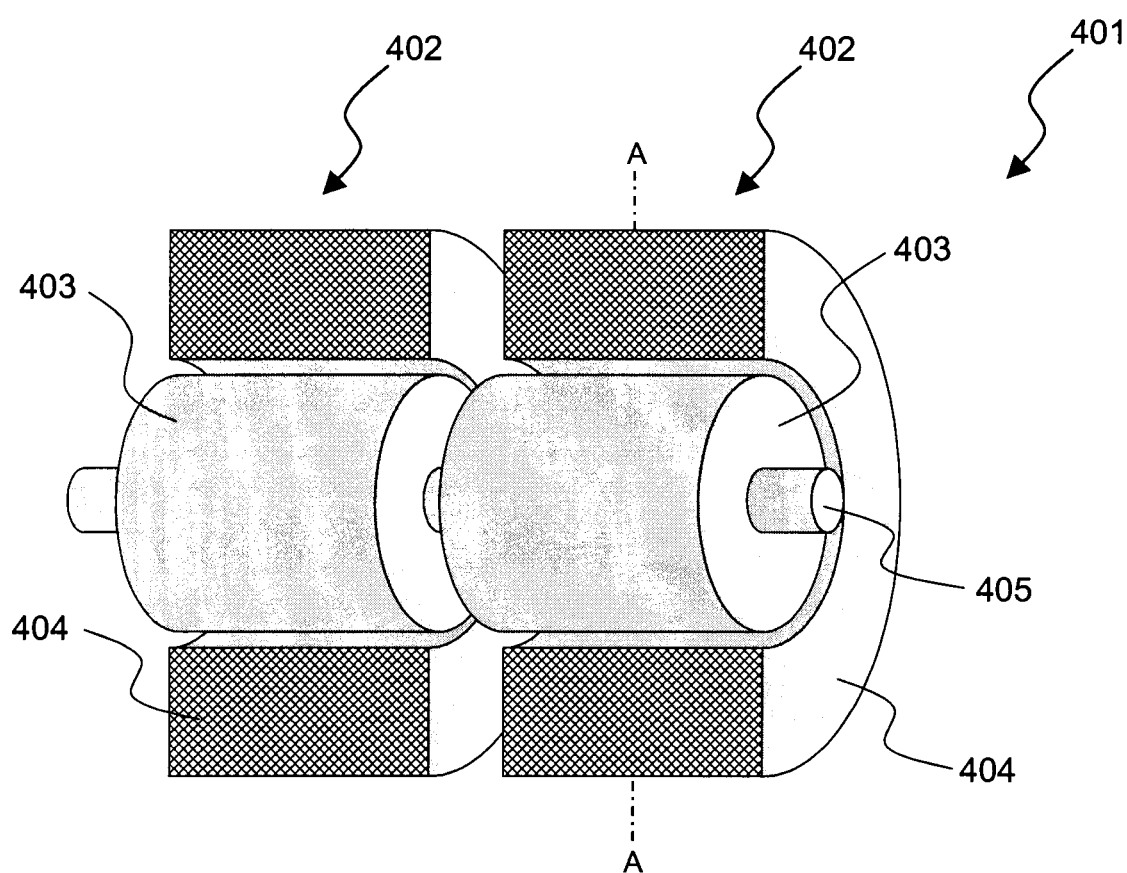
FIG. 12 is an overall view showing a configuration of a rotary machine 401 according to a fifth embodiment.
Figure 13:
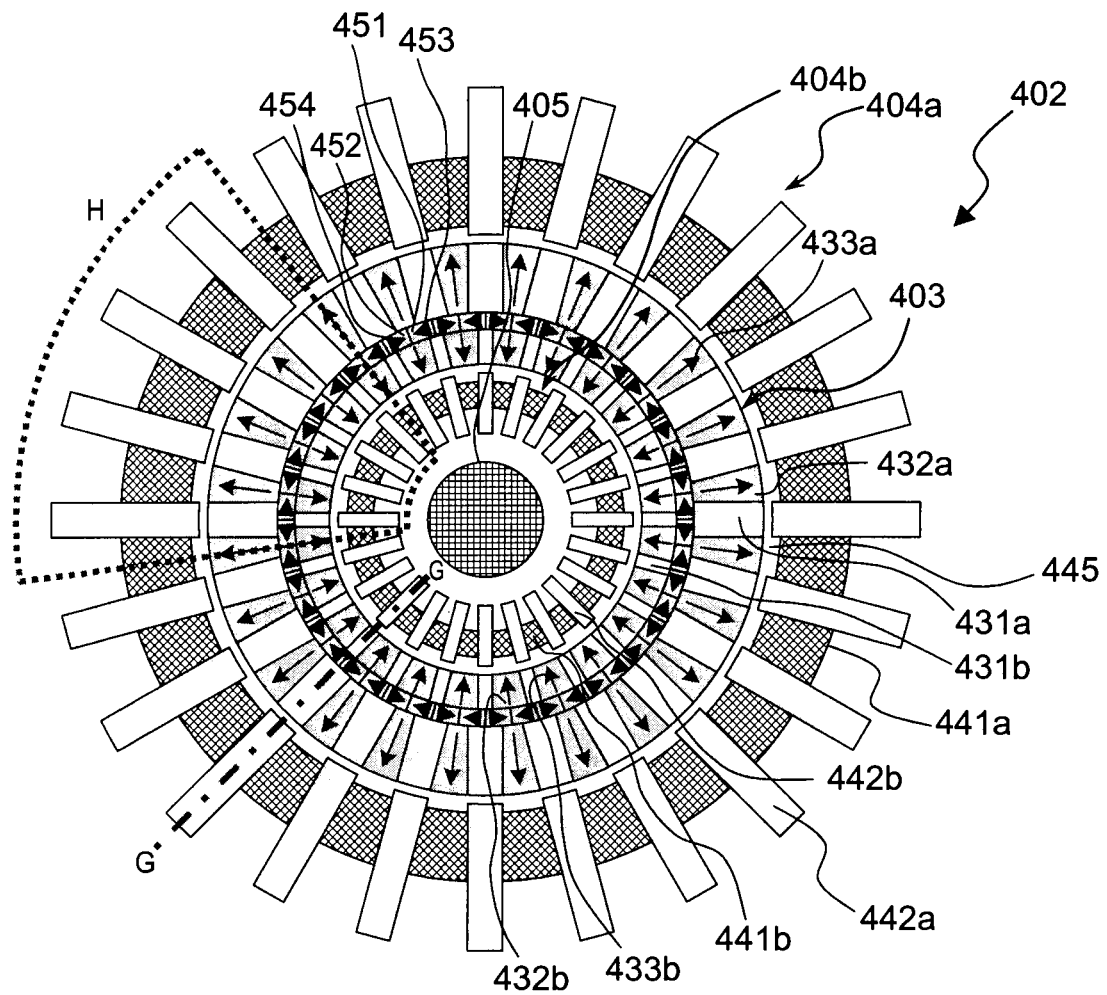
FIG. 13 is a cross-sectional view showing a configuration of a driving component 402 of FIG. 12.
Figure 15:
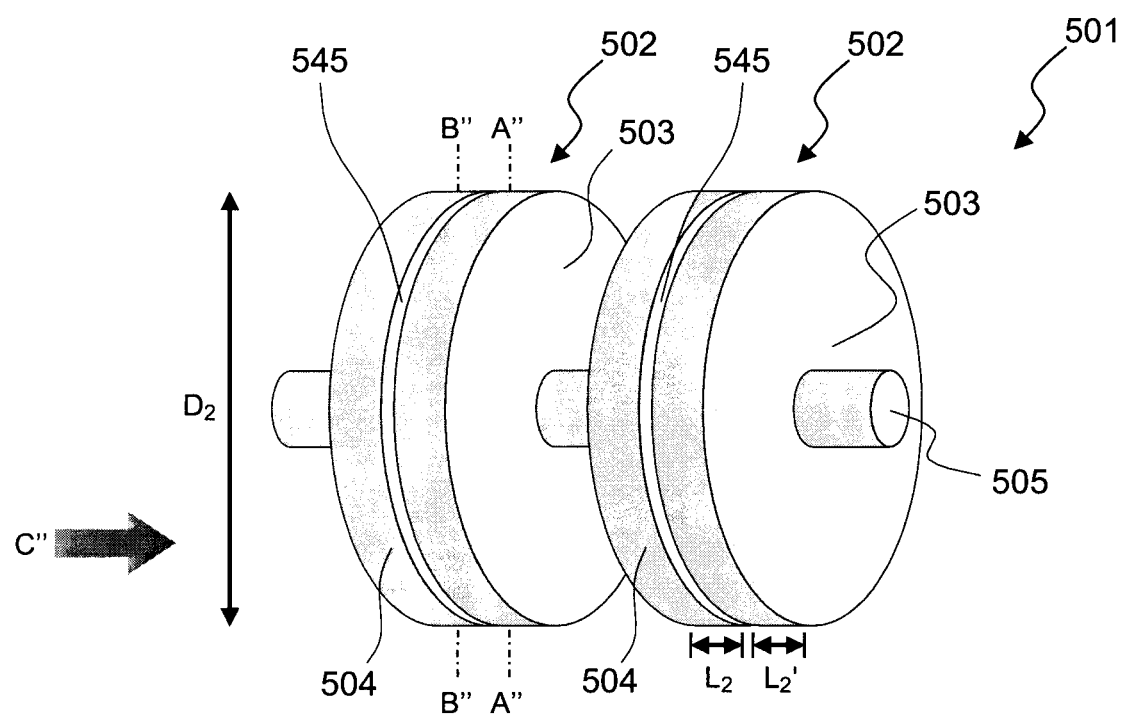
FIG. 15 is an overall view showing a configuration of a rotary machine 501 according to a sixth embodiment.
Figure 16:
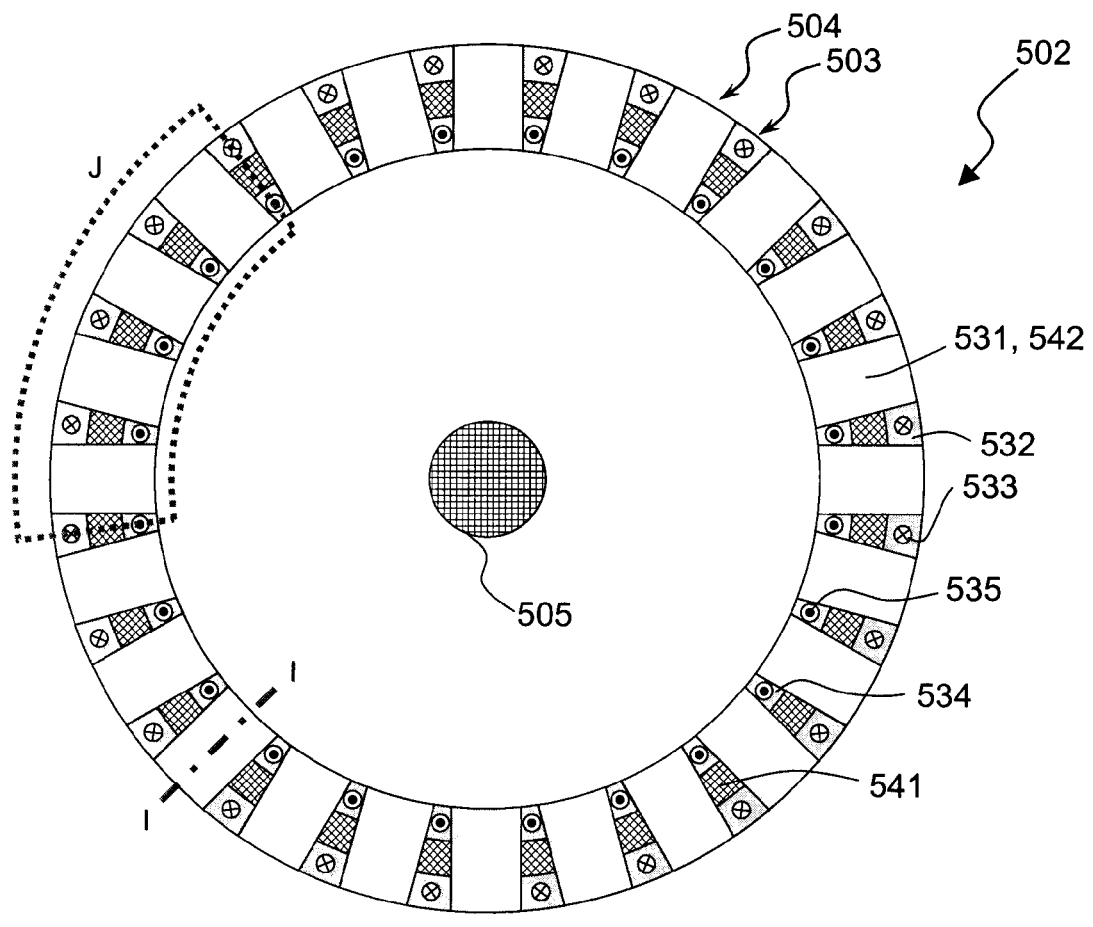
FIG. 16 is a view seen from a direction of an arrow C'' shown in FIG. 15, and is a view showing a configuration of a driving component 502.
Figure 17:
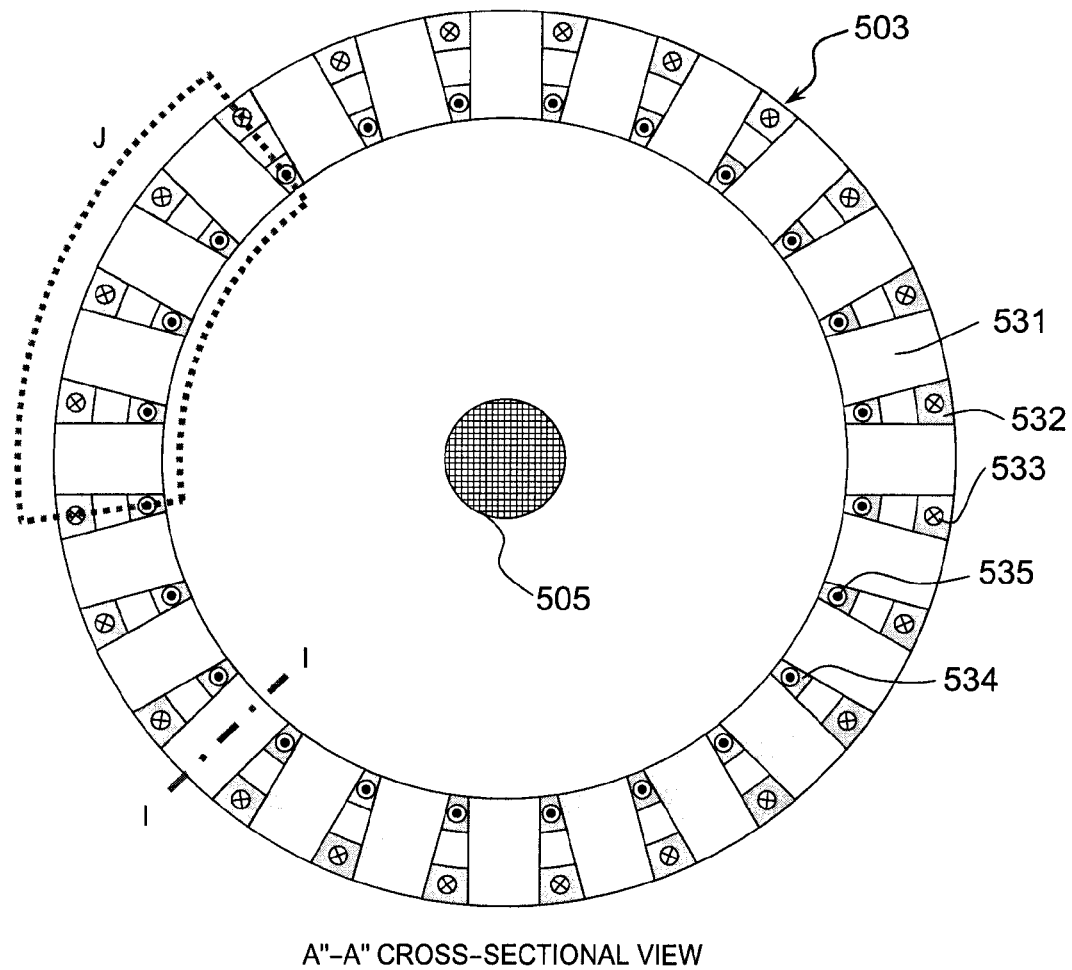
FIG. 17 is a cross-sectional view showing a configuration of a rotary component 503 of FIG. 15.
Figure 18:
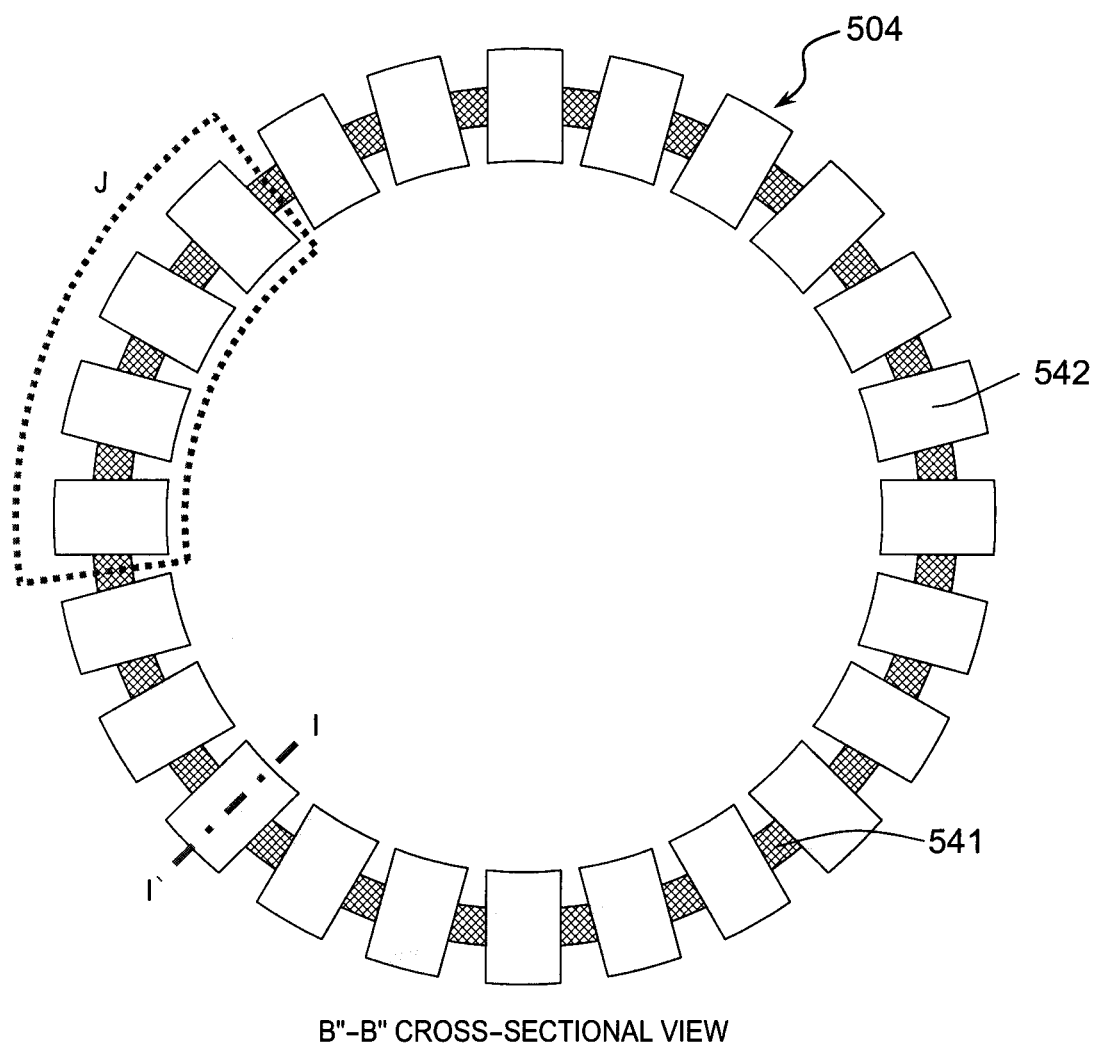
FIG. 18 is a cross-sectional view showing a configuration of a stationary component 504 of FIG. 15.
Figure 20:
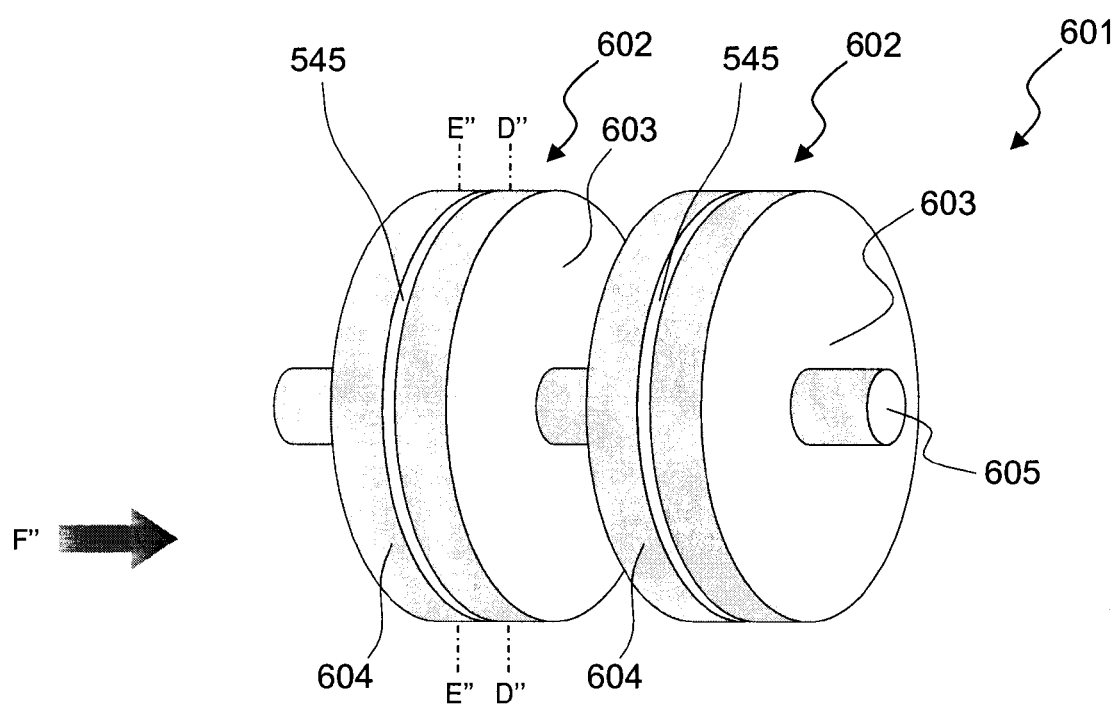
FIG. 20 is an overall view showing a configuration of a rotary machine 601 according to a seventh embodiment.
Figure 21:
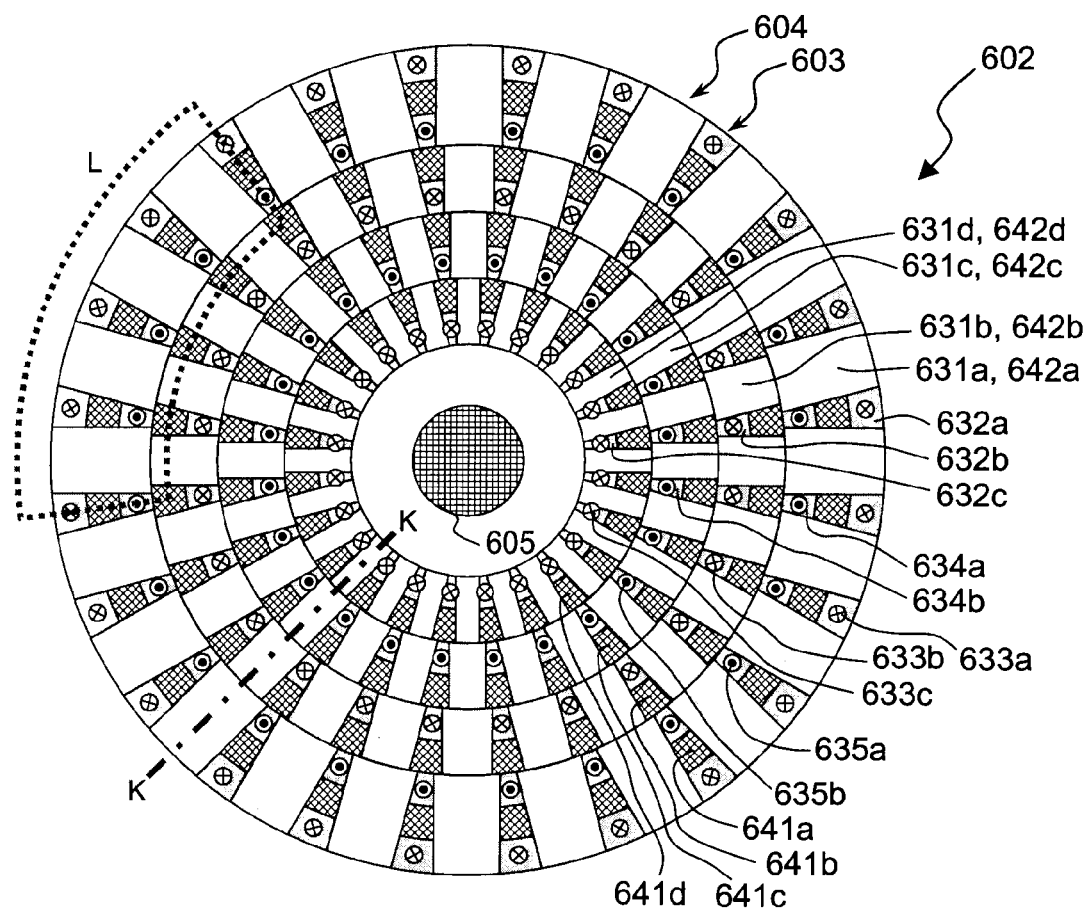
FIG. 21 is a view seen from a direction of an arrow F''' shown in FIG. 20, and is a view showing a configuration of a driving component 602.
Figure 22:
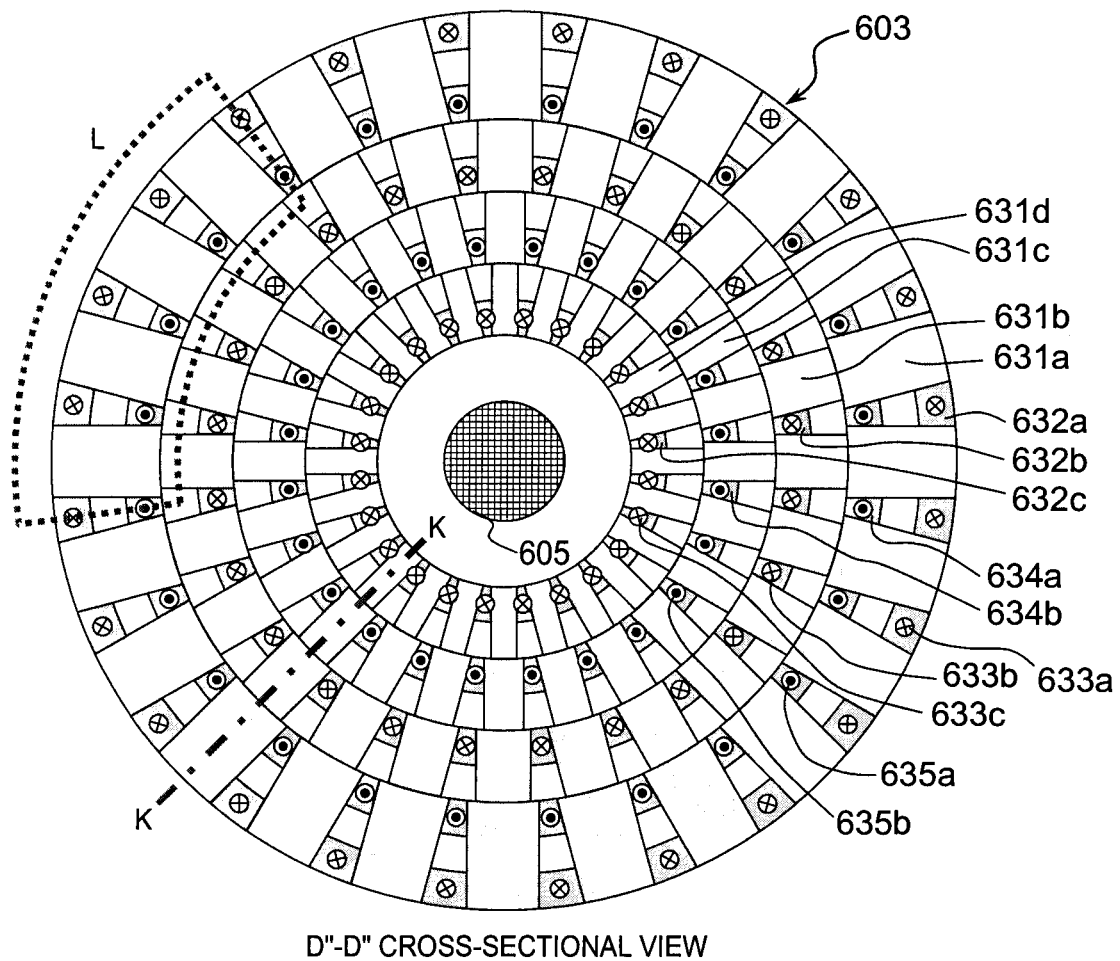
FIG. 22 is a cross-sectional view showing a configuration of a rotary component 603 of FIG. 20.
Figure 23:
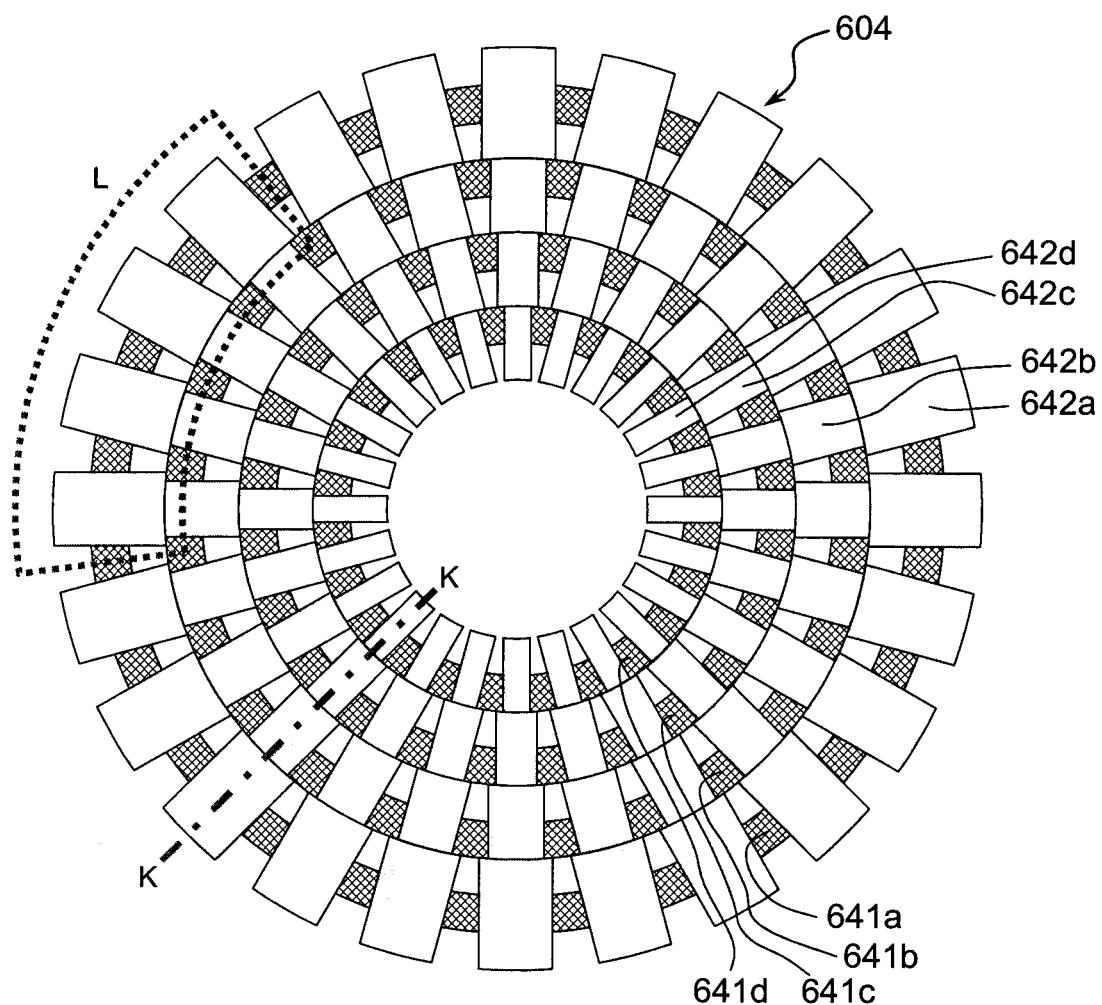
FIG. 23 is a cross-sectional view showing a configuration of a stationary component 604 of FIG. 20.
Figure 24:
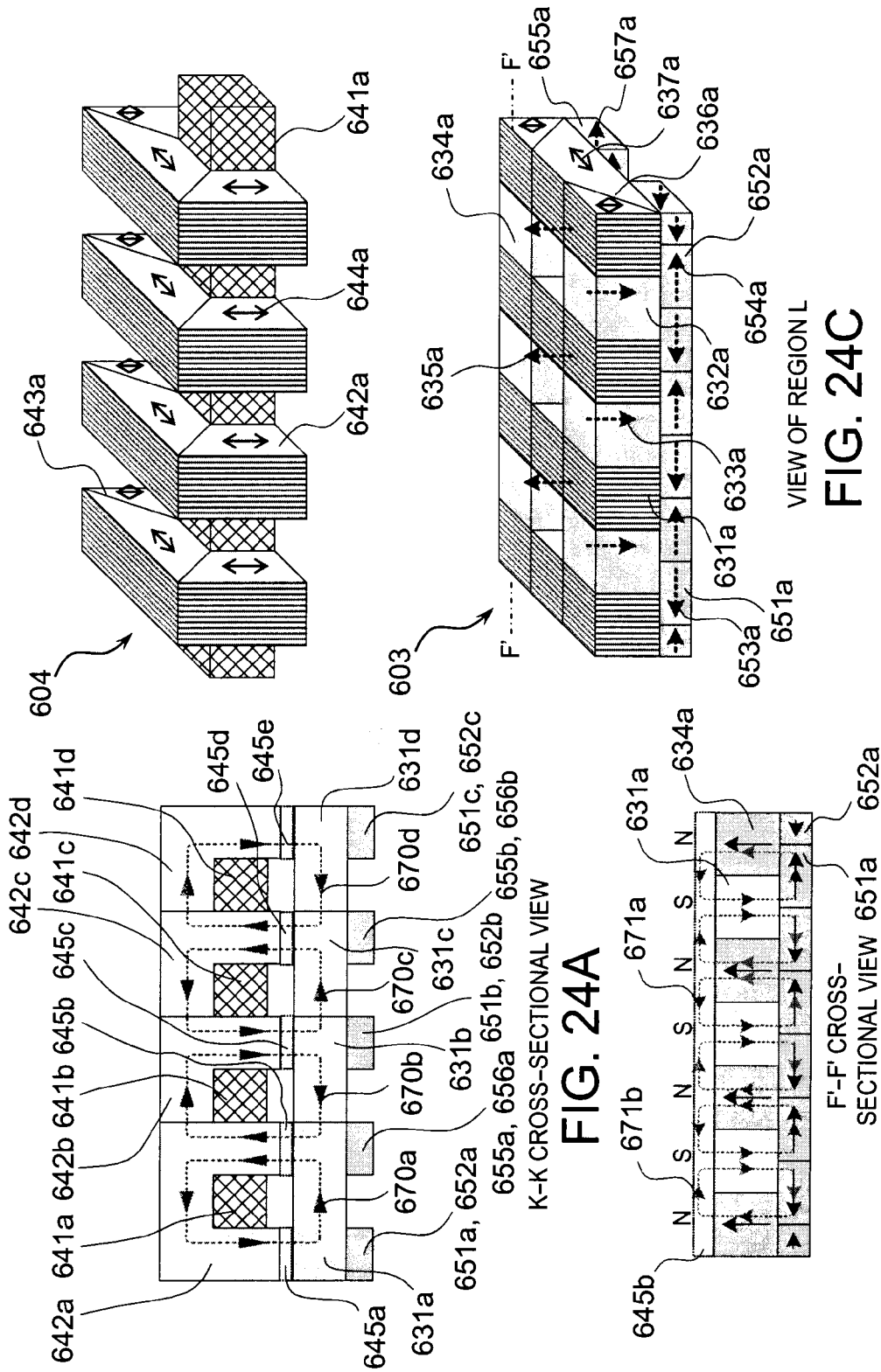
FIGS. 24A and 24B are cross-sectional views along K-K of FIG. 20 and F'-F'.
FIG. 24C is an enlarged view of a region L of FIG. 20.
Figure 25:
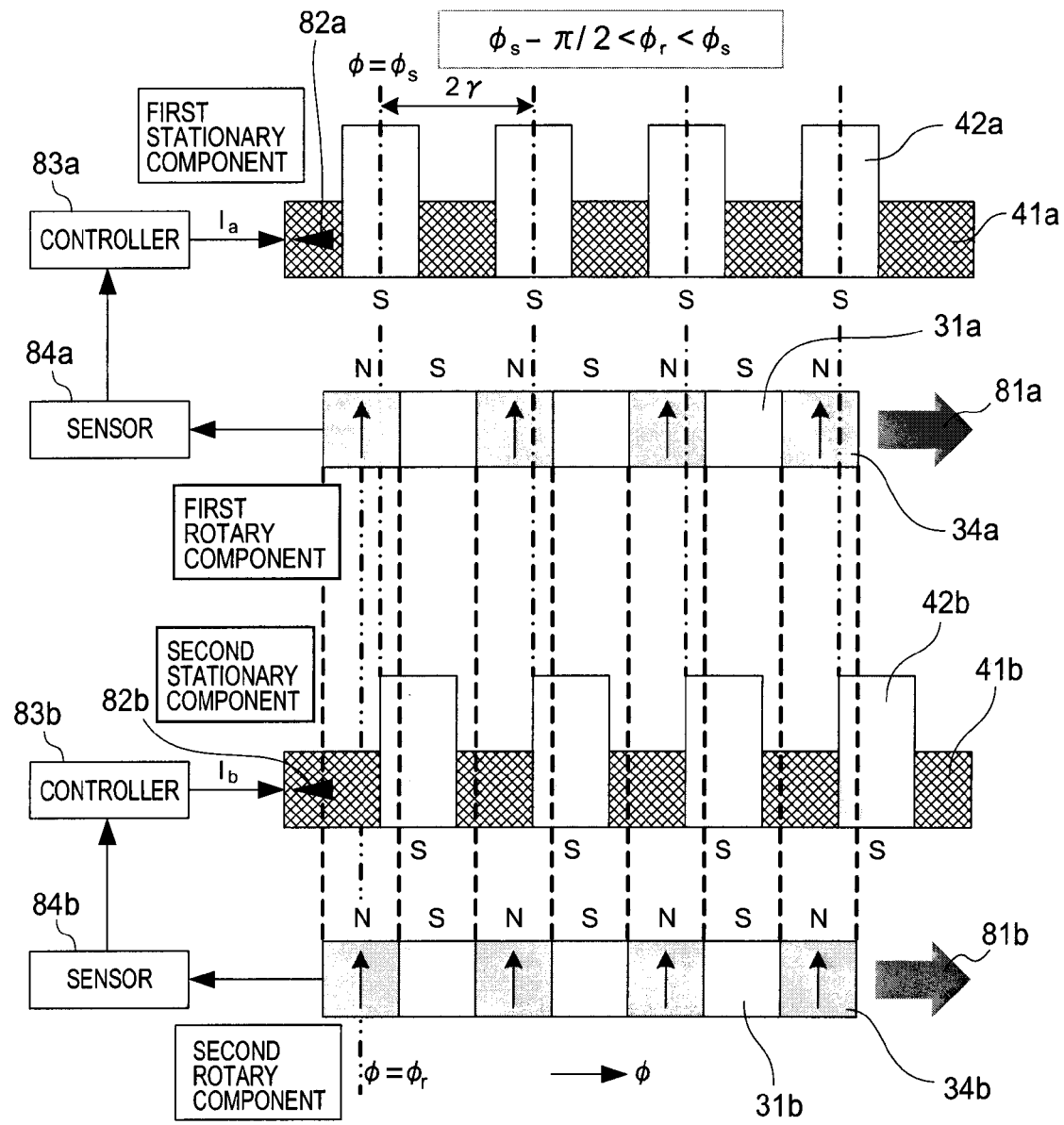
FIG. 25 is a diagram showing a relationship of a direction of current to generate rightward driving force in the rotary machine 1 and magnetization of a ferromagnets 42 according to the first embodiment.
Figure 26:
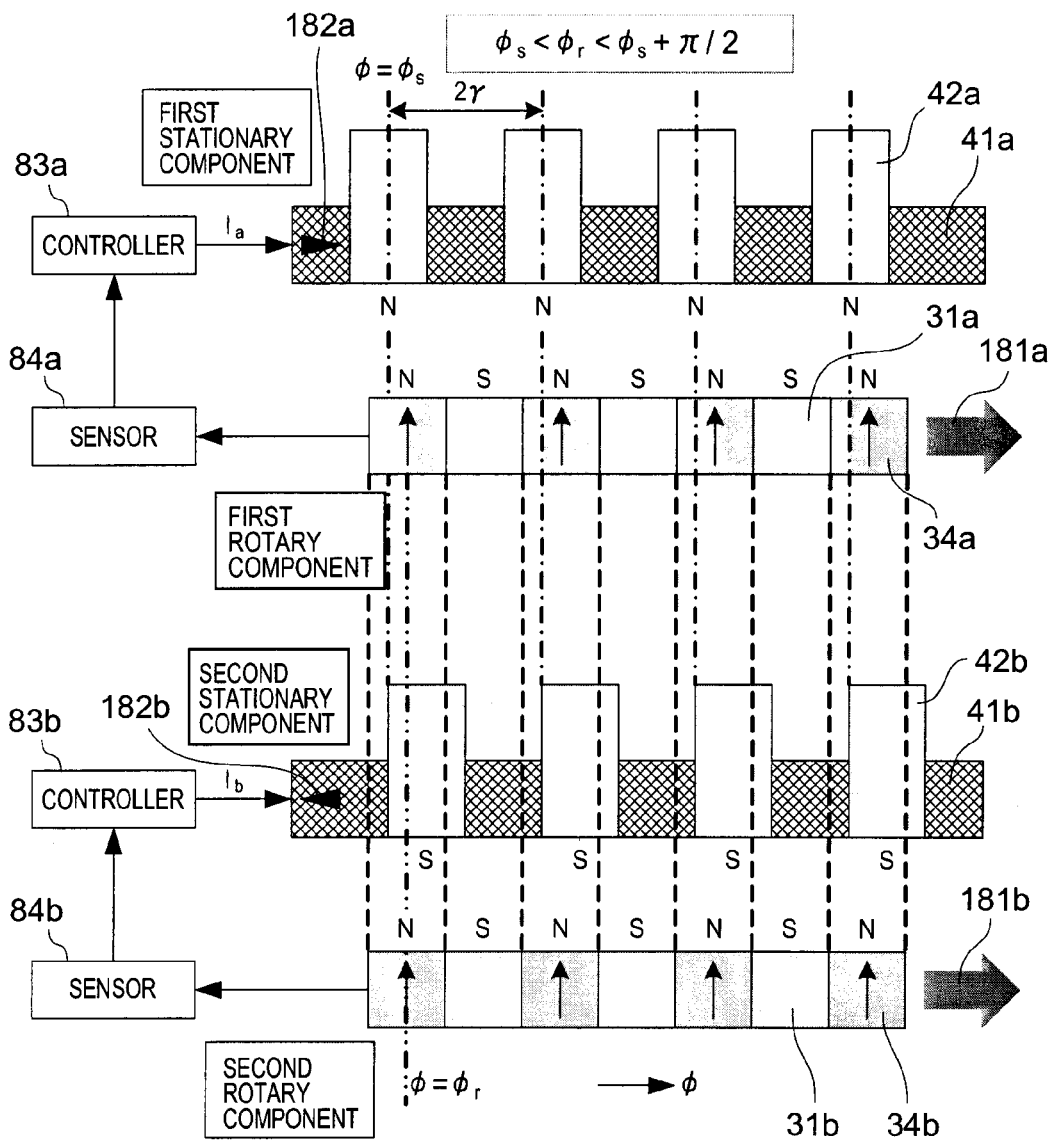
FIG. 26 is a diagram showing the relationship of the direction of the current to generate the rightward driving force in the rotary machine 1 and the magnetization of the ferromagnets 42 according to the first embodiment.
Figure 27:
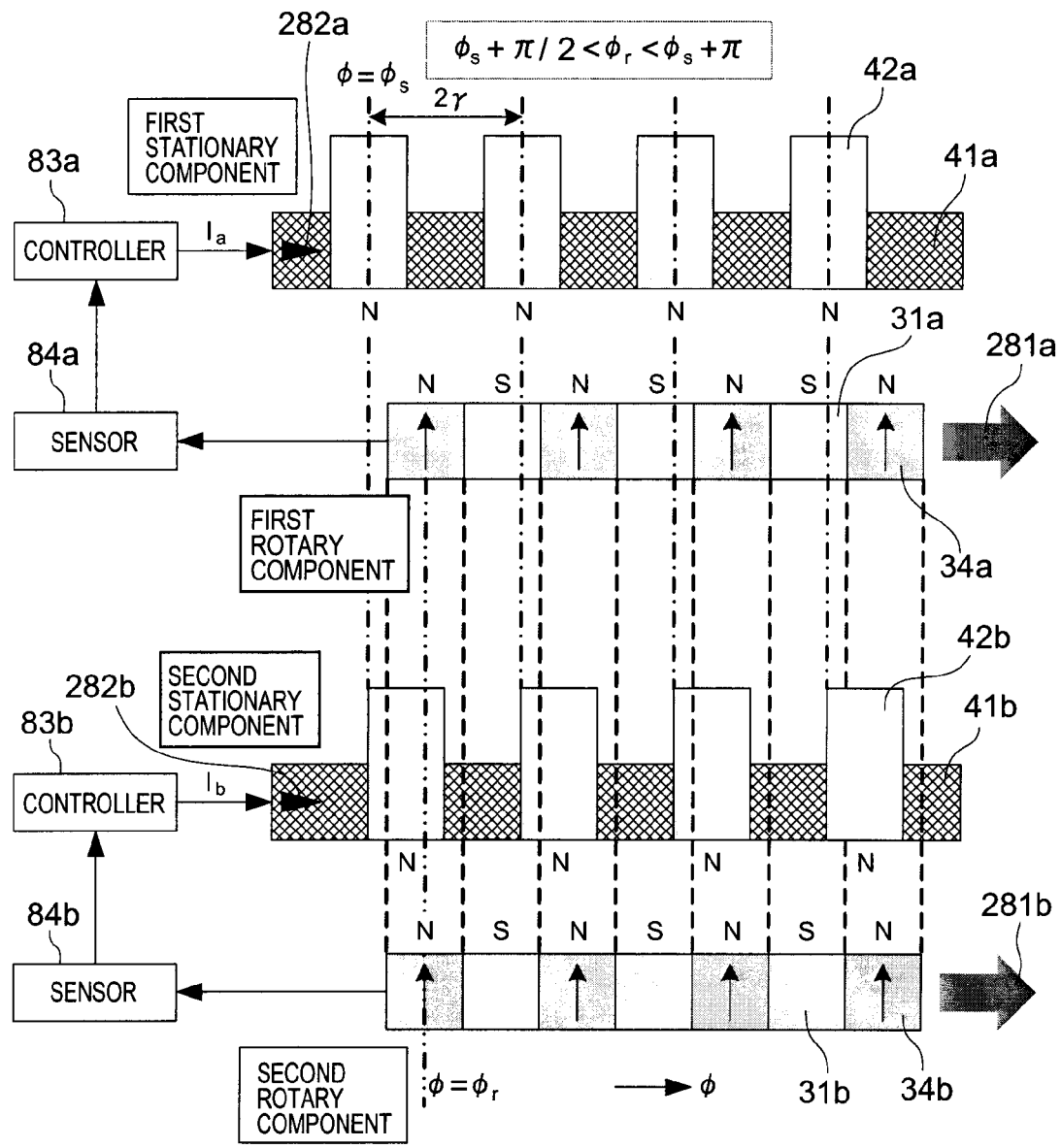
FIG. 27 is a diagram showing the relationship of the direction of the current to generate the rightward driving force in the rotary machine 1 and the magnetization of the ferromagnets 42 according to the first embodiment.
Figure 28:
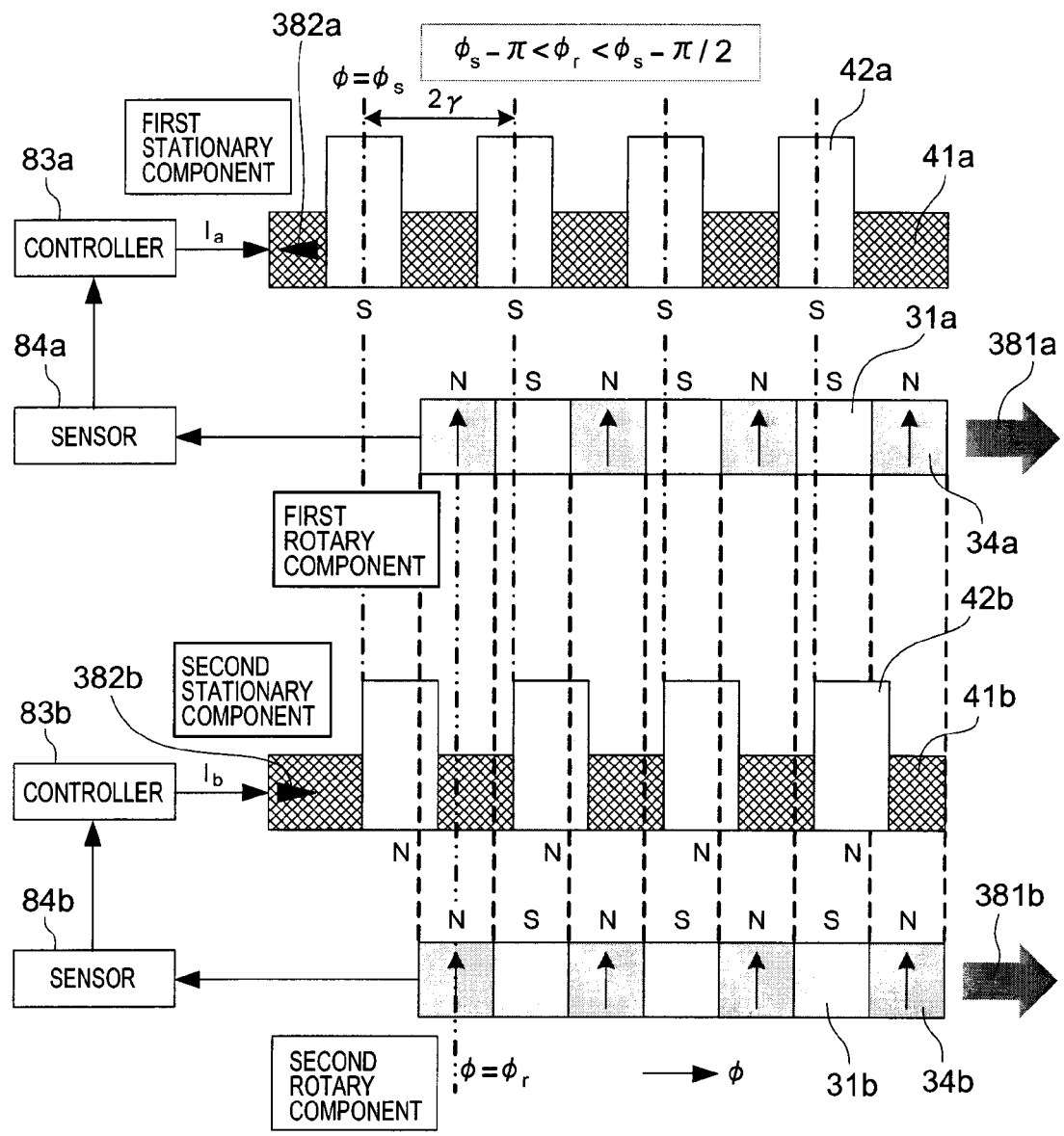
FIG. 28 is a diagram showing the relationship of the direction of the current to generate the rightward driving force in the rotary machine 1 and the magnetization of the ferromagnets 42 according to the first embodiment.
Figure 29:
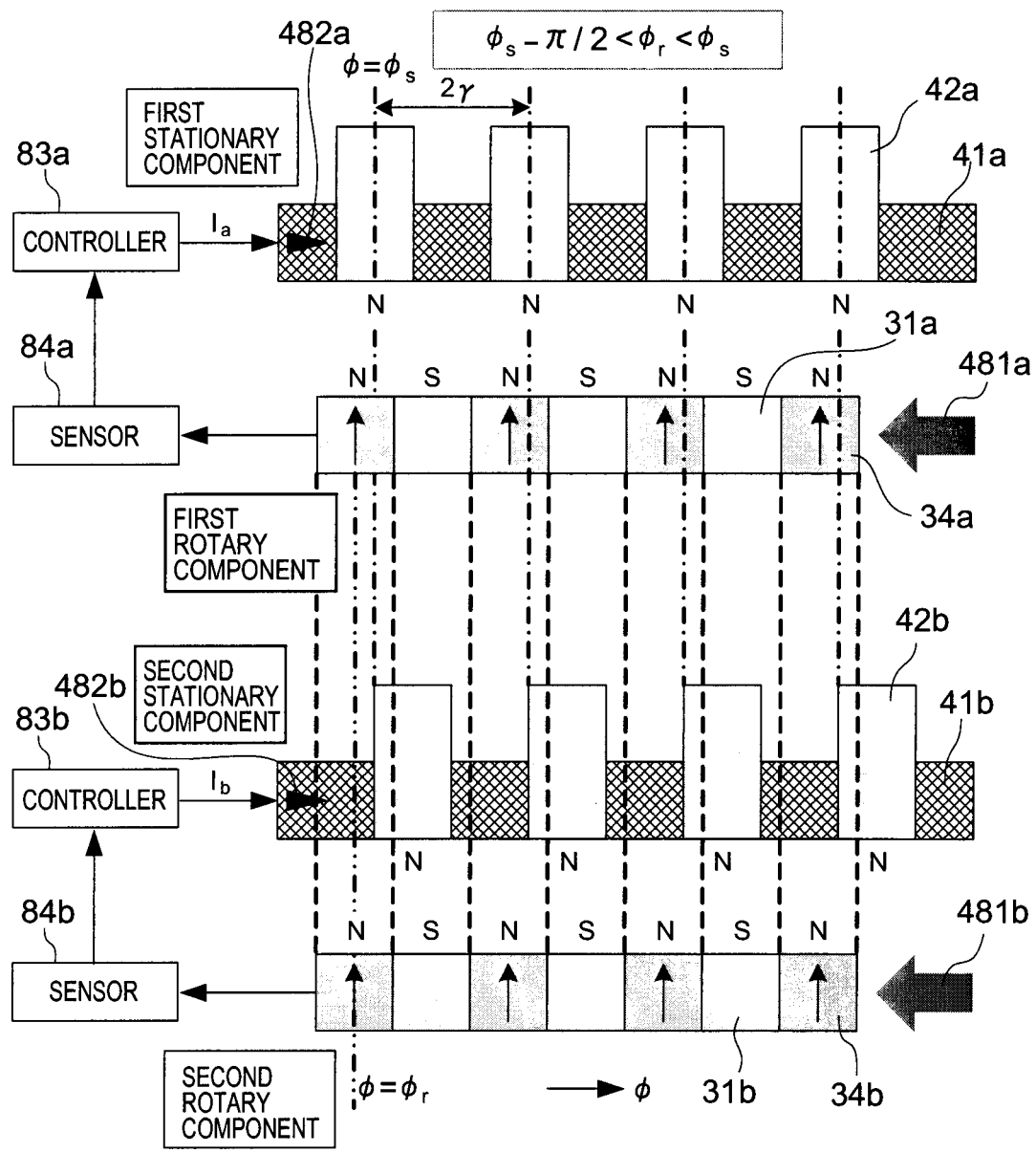
FIG. 29 is a diagram showing a relationship of a direction of current to generate leftward driving force in the rotary machine 1 and the magnetization of the ferromagnets 42 according to the first embodiment.
Figure 30:
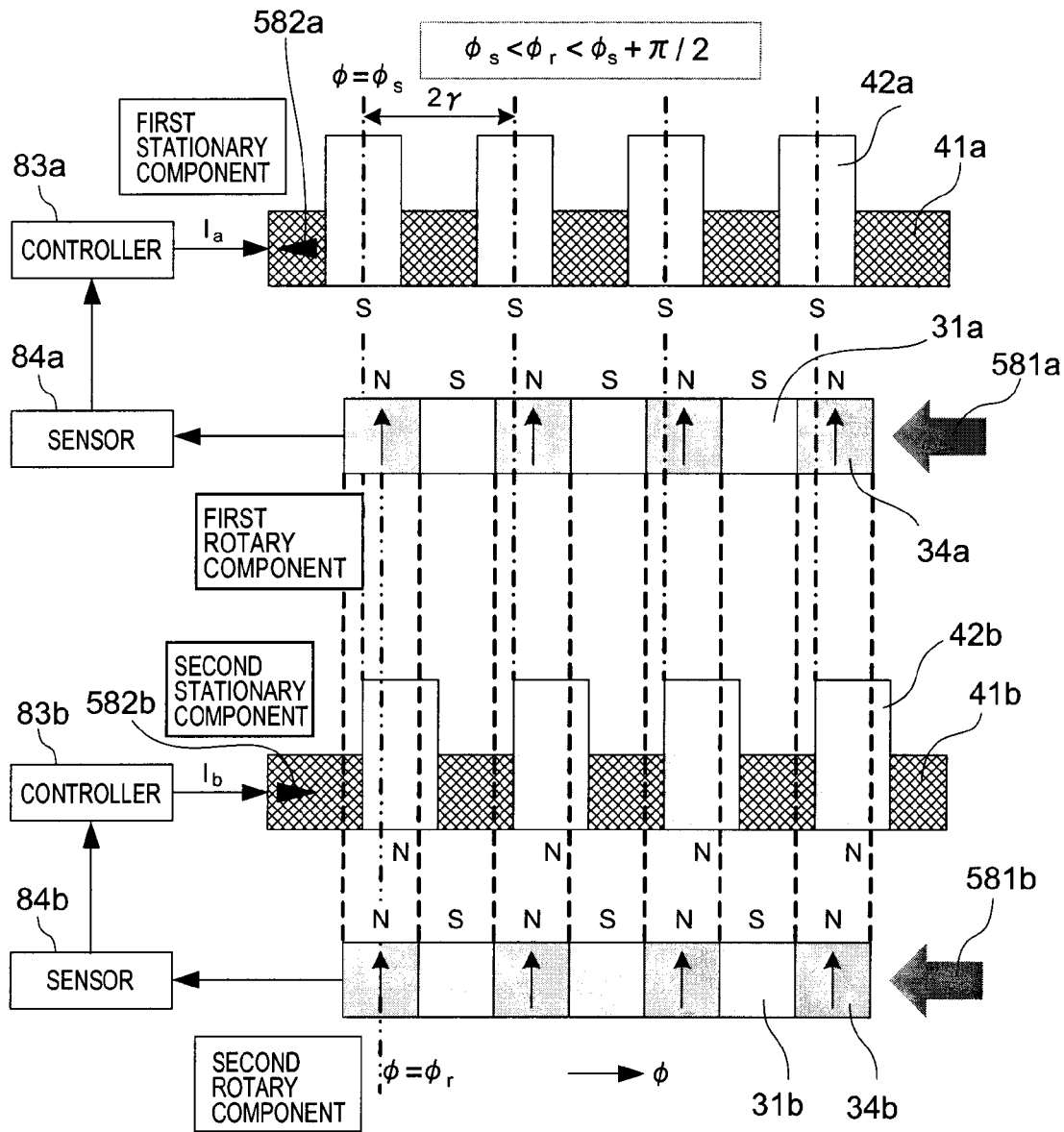
FIG. 30 is a diagram showing the relationship of the direction of the current to generate the leftward driving force in the rotary machine 1 and the magnetization of the ferromagnets 42 according to the first embodiment.
Figure 31:
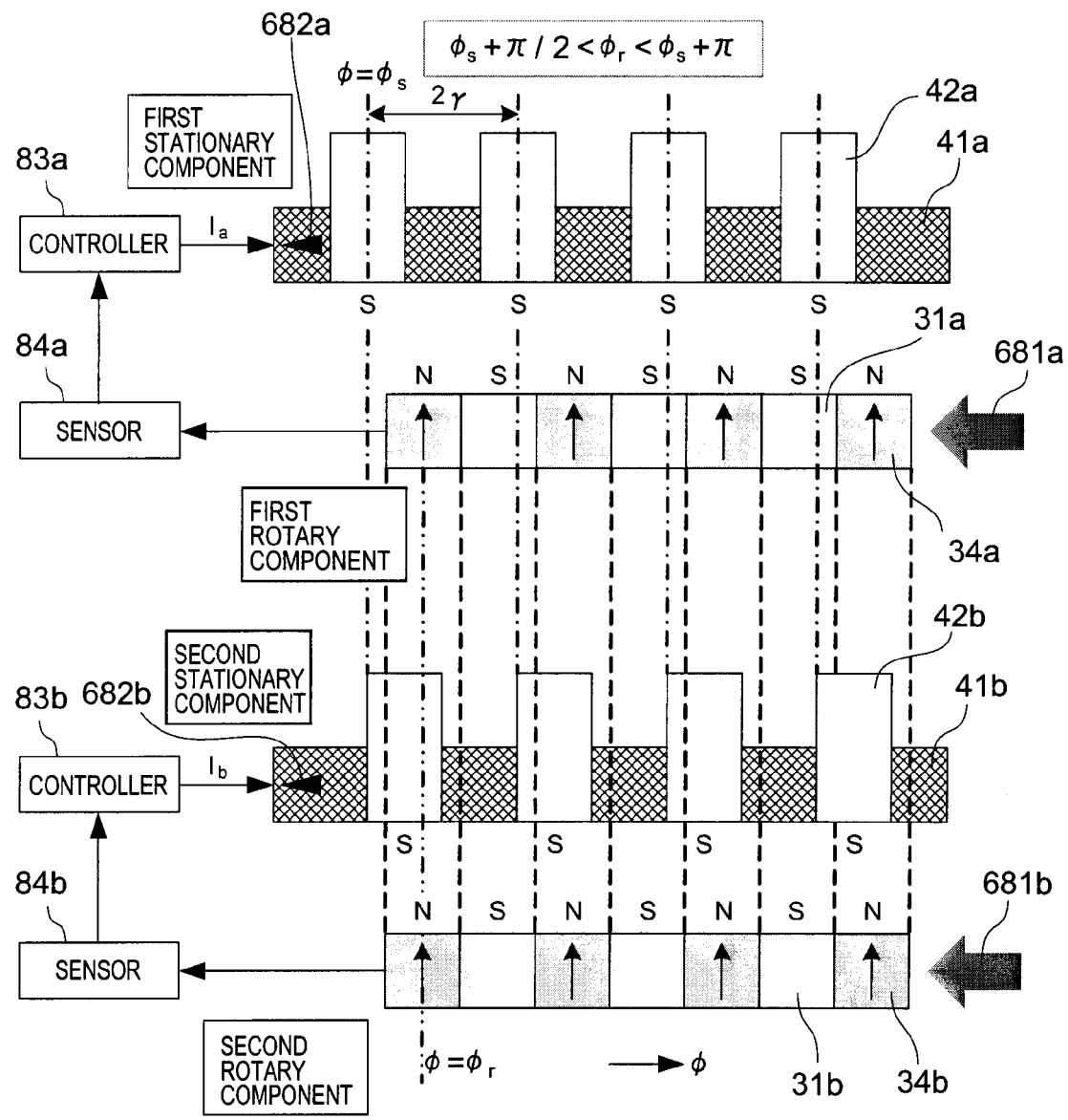
FIG. 31 is a diagram showing the relationship of the direction of the current to generate the leftward driving force in the rotary machine 1 and the magnetization of the ferromagnets 42 according to the first embodiment.
Figure 32:
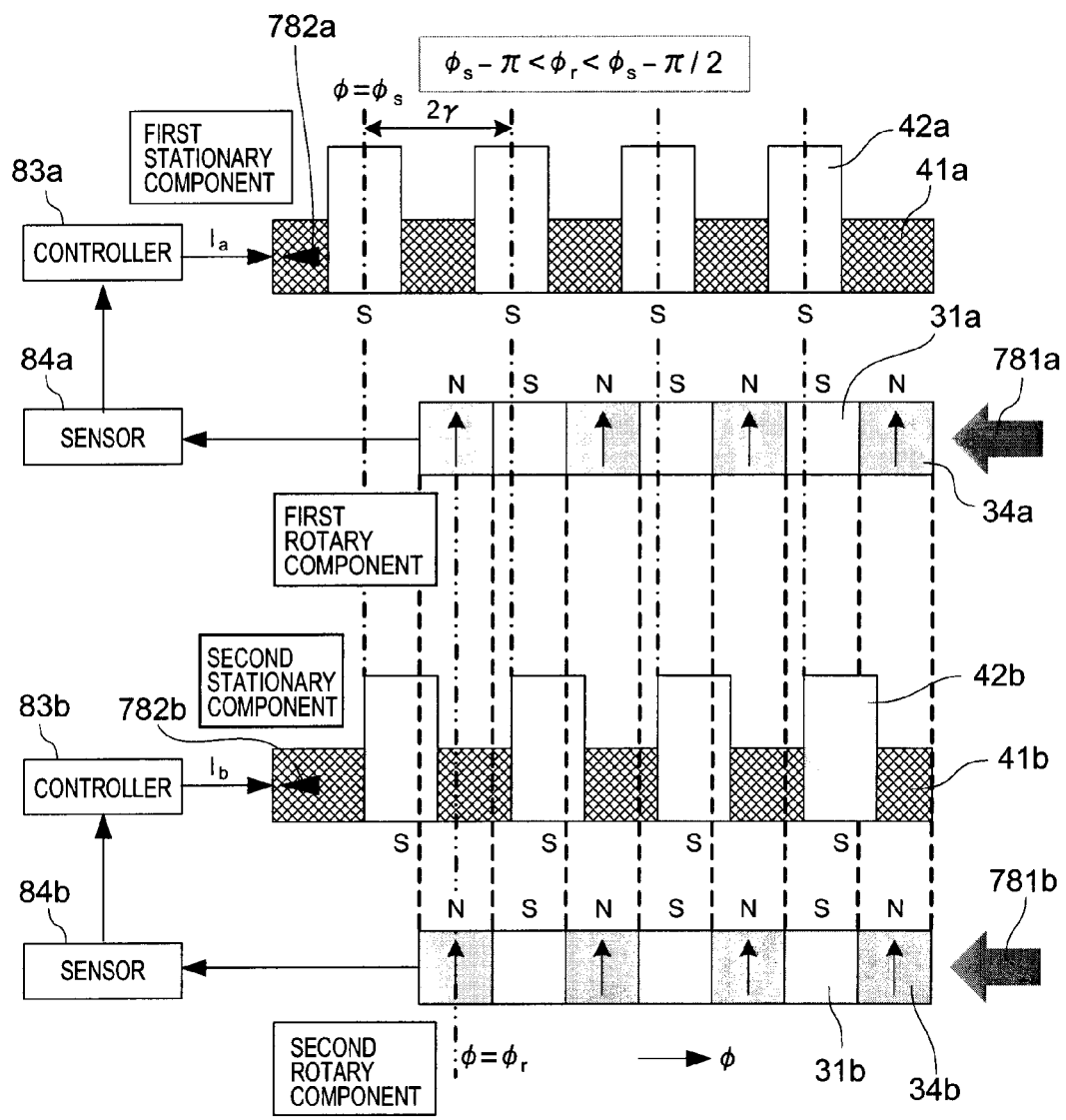
FIG. 32 is a diagram showing the relationship of the direction of the current to generate the leftward driving force in the rotary machine 1 and the magnetization of the ferromagnets 42 according to the first embodiment.

FIGS. 12 to 14 are views for explaining a configuration of a rotary machine 401 of a fifth embodiment. Although the basic configuration is the same as the rotary machine 201 as aforementioned, it differs in that plural sets of a rotary component 403 and a stationary component 404 are concentrically arranged in a driving component 402. Here, it is configured of two sets of stationary components 404a, 404b, and rotary components 403 including magnetic field generating sections 432a, 434a that generate magnetic fields in gaps 445a, 445b, and magnetic field generating sections 432b, 434b that generate magnetic fields in ferromagnets 431a and gaps 445c, 445d, and ferromagnets 431b. Further, by arranging magnetic field generating sections 451, 452 between the magnetic field generating sections 432a, 434a, the ferromagnets 431a and the magnetic field generating sections 432b, 434b, the ferromagnets 431b, the magnetic force is strengthened similar to the third embodiment. The magnetic field generating sections 432a, 434a and the ferromagnets 431a are respectively arranged at the same phase in the rotational direction as the magnetic field generating sections 432b, 434b, and the ferromagnets 431b, whereas the magnetic field generating sections 432a, 434a are generating magnetic fields that are opposite of magnetic fields of the magnetic field generating sections 432b, 434b. According to this configuration, magnetic interactions with the two sets of stationary components 404a, 404b are caused on a radially inside and outside of the rotary components 403, and strong torque can be generated.

Sixth Embodiment

FIGS. 15 to 19 are views for explaining a configuration of a rotary machine 501 of a sixth embodiment. Although the basic configuration is the same as the rotary machine 1 as aforementioned, it differs in that a rotary component 503 and a stationary component 504 are opposing in the axial direction. In this case, when a winding 541 is excited, magnetic flux flows in paths of the ferromagnet 542, a gap 545a, a ferromagnet 531, a gap 545b, and the ferromagnet 542 that are provided around the winding 541, and magnetic circulation paths 570 formed at that time are parallel to the radial direction and the axial direction, as are similar to the first embodiment. On the other hand, flux of magnetic field generating section 532 (534) flows in paths of the magnetic field generating section 532 (534), the gap 545a (545b), the ferromagnet 542, the gap 545a (545b), the ferromagnet 531, a gap 546a (546b), and the magnetic field generating section 532 (534), however, magnetic circulation paths 571 that are formed at this time are parallel to the axial direction and the circumferential direction, as are different from the first embodiment. In this configuration, when a diameter of the rotary component 503 and the stationary component 504 is $D_2$, an area of a surface by which the rotary component 503 and the stationary component 504 oppose one another becomes $pD_2^2$ at the maximum; it is proportionate to a square of the diameter $D_2$, and is substantially not dependent on lengths $L_2$, $L_2'$ of the rotary component 503 and the stationary component 504 in the axial direction. Due to this, it is possible to configure the rotary machine 501 in which the lengths $L_2$, $L_2'$ in the axial direction are small, and by enlarging the diameter $D_2$, strong torque proportionate to the square thereof can be generated.

Seventh Embodiment

FIGS. 20 to 24 are views for explaining a configuration of a rotary machine 601 of a seventh embodiment. Although the basic configuration is the same as the rotary machine 501 as aforementioned, it differs in that plural sets of windings 641, ferromagnets 642, ferromagnets 631 and magnetic field generating sections 632, 651, 652 (634, 655, 656) are arranged as shown in a cross-sectional view along K-K in FIG. 21. Here, it is configured of four sets of the windings 641, the ferromagnets 642 and the ferromagnets 631, three sets of magnetic field generating sections 632, 651, 652 and two sets of magnetic field generating sections 634, 655, 656. It is similar to the sixth embodiment in regards to one set worth of the windings 641, the ferromagnets 642, the ferromagnets 631, the magnetic field generating sections 632, 651, 652 (634, 655, 656), however, four sets of magnetic circulation paths 670*a*, 670*b*, 670*c*, 670*d* are formed by exciting the four sets of the windings 641*a*, 641*b*, 641*c*, 641*d*. Here, if the directions of the currents in the windings 641*a* and 641*c* are the same, and said directions are opposite the currents in the windings 641*b*, 641*d*, magnetic fields that had been generated by the four windings in gaps 645*b*, 645*c*, 645*d* strengthen one another. According to this configuration, the windings 641, the ferromagnets 642, the ferromagnets 631 and the magnetic field generating sections 632, 651, 652 (634, 655, 656) can be arranged at high density, and the rotary machine having highly concentrated output can be realized.

Eighth Embodiment

A vehicle of an eighth embodiment includes the rotary machine of the first embodiment. The vehicle described herein refers e.g. to a two to four-wheeled hybrid electric automobile, a two to four-wheeled electric automobile, a motor-assisted bicycle, and the like.

Figure 35:
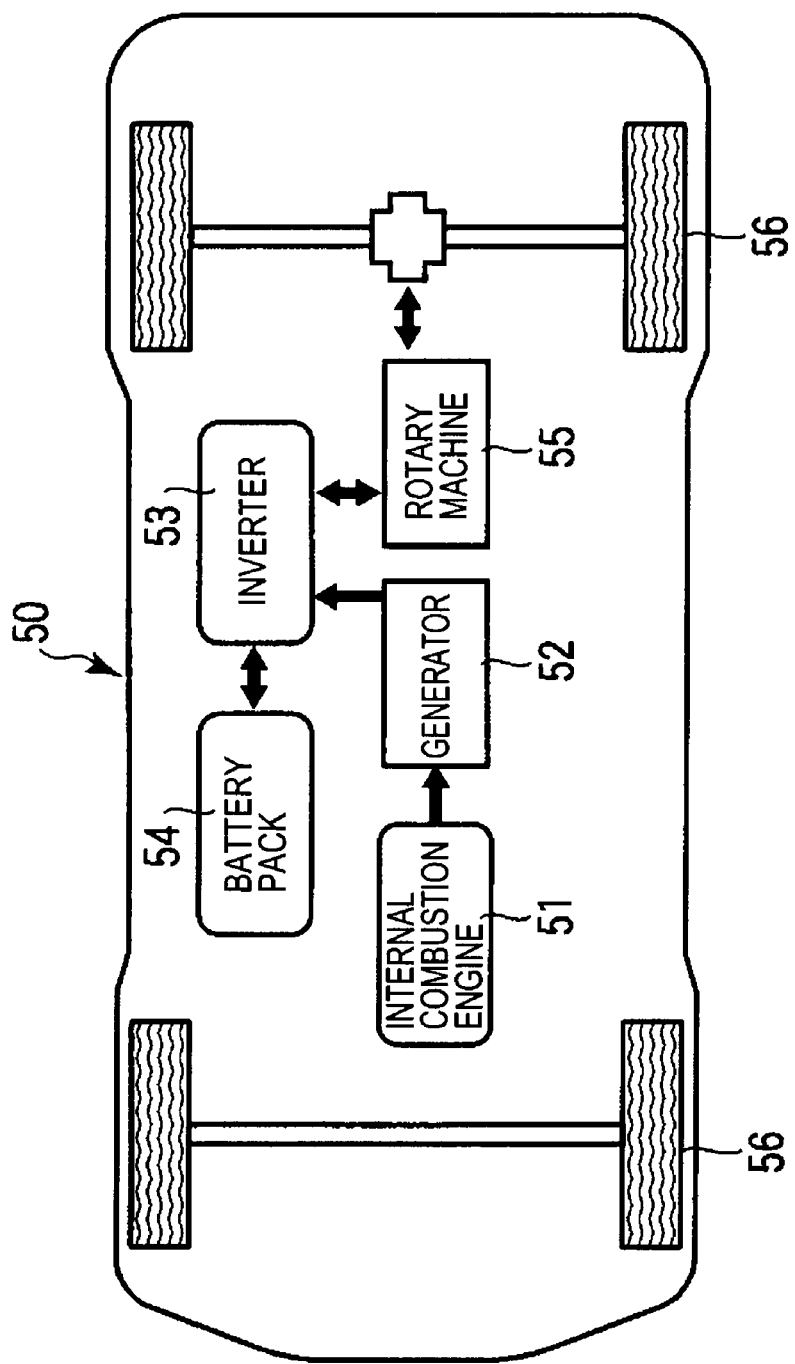
FIG. 35 is a schematic diagram showing a series hybrid automobile according to an eighth embodiment.
Figure 36:
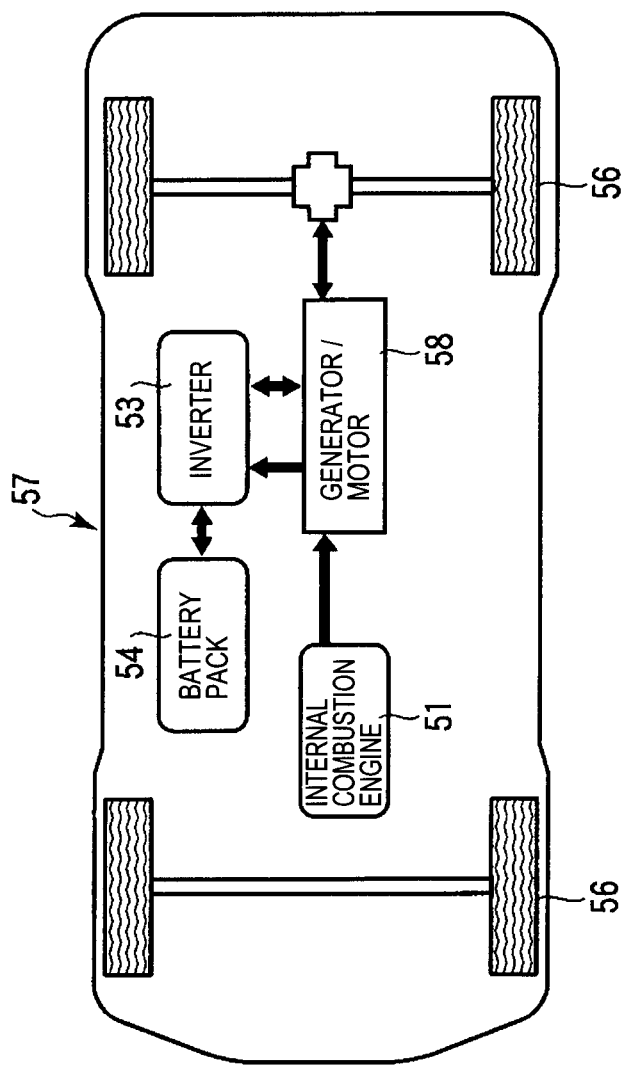
FIG. 36 is a schematic diagram showing a parallel hybrid automobile according to the eighth embodiment.
Figure 37:
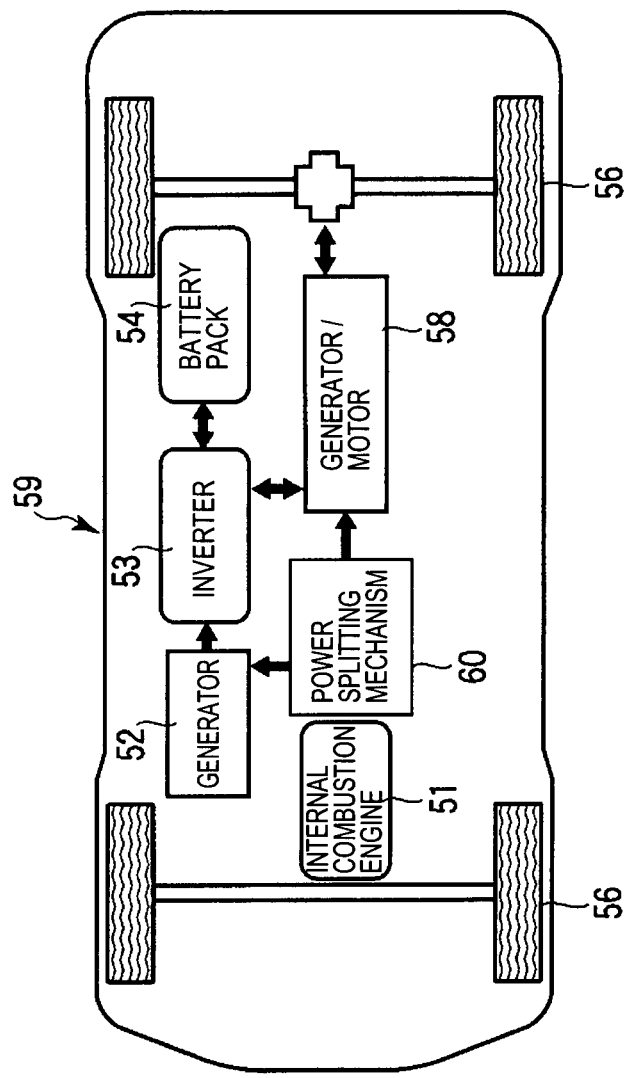
FIG. 37 is a schematic diagram showing a series-parallel hybrid automobile according to the eighth embodiment.
Figure 38:
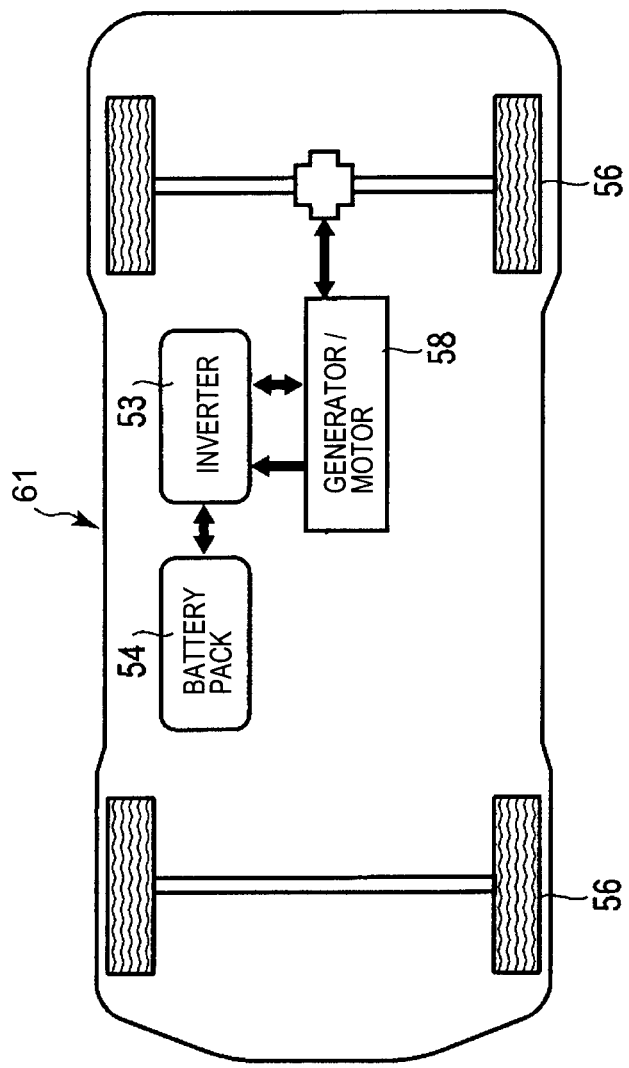
FIG. 38 is a schematic diagram showing an electric automobile according to the eighth embodiment.

FIGS. 35 to 37 show hybrid type automobiles in which an internal combustion engine and a battery-powered rotary machine are combined as a running power source. FIG. 38 shows an electric automobile having the battery-powered rotary machine as the running power source. As driving force of the automobile, a power source having wide ranges of engine speed and torque depending on the running conditions are necessary. Generally, the internal combustion engine is limited as to its torque and engine speed by which ideal energy efficiency is exhibited, the energy efficiency is decreased in driving conditions other than the above. In the hybrid type automobile, it has a characteristic that the energy efficiency of the entire automobile can be improved by driving the internal combustion engine at an optimal condition to generate electricity, and driving wheels with a high-efficiency rotary machine, or by driving in combination the power of the internal combustion engine and the rotary machine. Further, by regenerating the kinetic energy comprised by the automobile upon moderation as electric power, mileages per fuel units can be dramatically increased compared to an automobile using only the typical internal combustion engine.

The hybrid automobile can roughly be categorized into three types depending on how the internal combustion engine and the rotary machine are combined.

FIG. 35 shows a hybrid automobile 50 that is generally called a series hybrid automobile. Entirety of power of an internal combustion engine 51 is once converted into electric power by a generator 52, and this electric power is charged in a battery pack 54 through an inverter 53. The electric power of the battery pack 54 is supplied to a rotary machine 55 of the first embodiment through the inverter 53, and wheels 56 are driven by the rotary machine 55. It has such a system as if a generator is combined in an electric automobile. The internal combustion engine can be driven under a high efficiency condition, and the regeneration of electric power is also possible. On the other hand, since the driving of the wheels is performed only by the rotary machine, a high-output rotary machine is necessary.

FIG. 36 shows a hybrid automobile 57 that is called a parallel hybrid automobile. Reference number 58 denotes the rotary machine of the first embodiment that serves also as the generator. The internal combustion engine 51 primarily drives the wheels 56, converts a part of its power to electric power by the generator 58 depending on the situation, and the battery pack 54 is charged by the electric power. The rotary machine 58 supports the driving force upon takeoff with increasing load, or upon acceleration. It has a typical automobile as its base, and has a system in which the high-efficiency is obtained by reducing the changes in the load of the internal combustion engine 51, and the regeneration of electric power and the like is also performed altogether. Since the driving of the wheels 56 is primarily performed by the internal combustion engine 51, the output of the rotary machine 58 can be determined optionally according to a proportion of the required support. The system can be configured even by using a relatively small rotary machine 58 and battery pack 54.

FIG. 37 shows a hybrid automobile 59 that is called a series-parallel hybrid automobile. It has a scheme in which both the series and the parallel are combined. A power splitting mechanism 60 splits the output of the internal combustion engine 51 for generating electricity and for driving wheels. The load control of the engine can be performed more delicately than the parallel scheme, and the energy efficiency can be increased.

FIG. 38 shows an automobile 61 that is an electric automobile. Reference number 58 denotes the rotary machine of the first embodiment that serves also as the generator. The rotary machine 58 drives the wheels 56, converts into electric power as the generator 58 depending on the situation, and the battery pack 54 is charged by the electric power.

Ninth Embodiment

Figure 39:
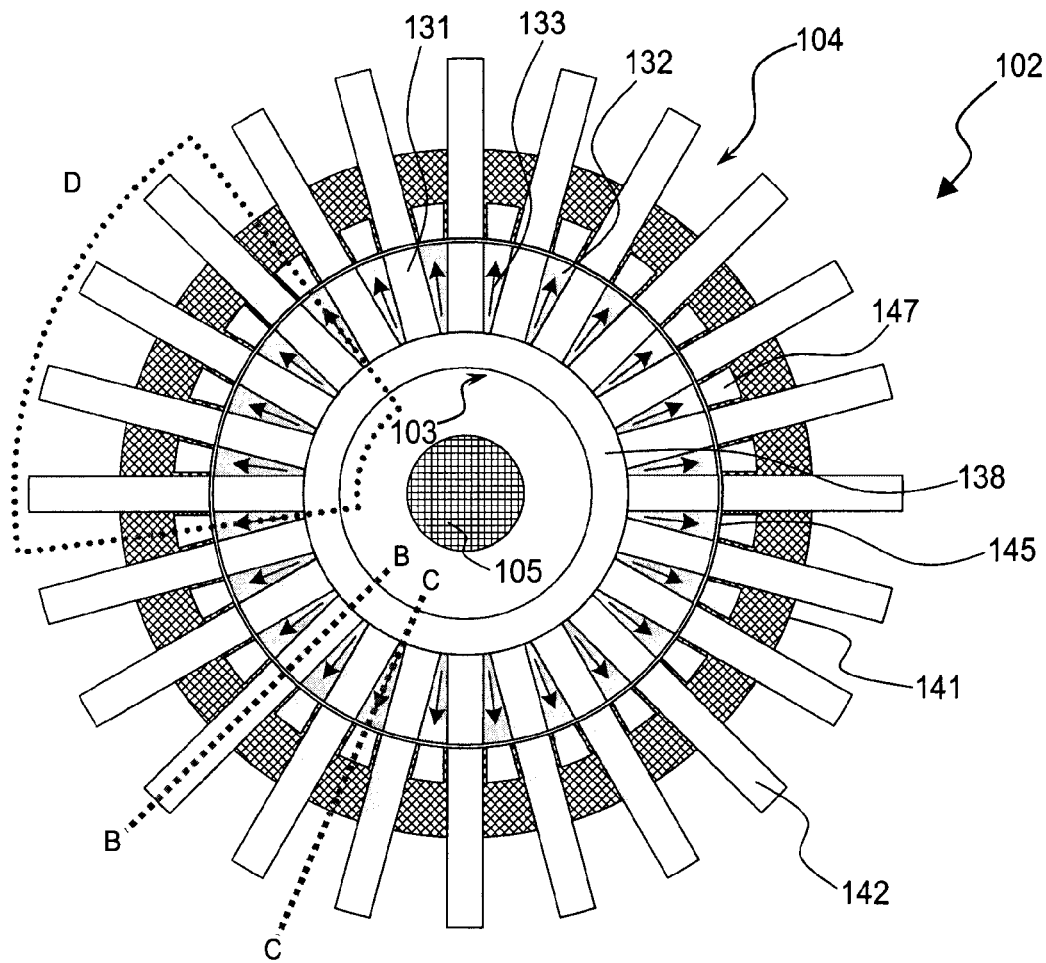
FIG. 39 is a cross-sectional view showing a configuration of a rotary component 102 according to a ninth embodiment.

FIGS. 39 to 40 are views for explaining a configuration of a rotary machine 101 of a ninth embodiment.

Although the basic configuration is the same as the rotary machine 101 of the second embodiment, it differs in that ferromagnets 147 are intervened between ferromagnets 142.

In the ninth embodiment, when a winding 141 is excited by applying current, as shown in a cross-sectional view along E-E in FIG. 40, magnetic flux flows in paths of the ferromagnet 142, a gap 145*a*, a ferromagnet 131, a gap 145*b*, and the ferromagnet 142 that are provided around the winding 141, and magnetic circulation paths 170 that are parallel to the radial direction and the axial direction are formed. On the other hand, flux of magnetic field generating section 132 (134) flows in paths of the magnetic field generating section 132 (134), the gap 145*a* (145*b*), the ferromagnet 147*a* (147*b*), the ferromagnet 142, the gap 145*a* (145*b*), the ferromagnet 131, the ferromagnet 138*a* (138*b*), and the magnetic field generating section 132 (134), and magnetic circulation paths 171*a* (171*b*) that are parallel to the radial direction and the circumferential direction are formed. At this time, in the path of the ferromagnet 142, the gap 145*a* (145*b*) and the ferromagnet 131, the excitation in the winding 141 and the flux of the magnetic field generating section 132 (134) interact with one another, and as a result, torque is generated in a rotary component 103. Further, since there are plural sets of the rotary component 103 and a stationary component 104 opposing one another, and there are plural sets in which the relative phase of the rotary component 103 and the stationary component 104 in the rotational direction differs, the torque control at the respective positions becomes possible by modulating the current in the windings 141 of said sets. Here, by using the ferromagnets 138 and 147, the permeance in the magnetic circulation paths 171 on a magnetic field generating section side is increased, whereby strong magnetic fields can be generated at the same magnetomotive force, and a high-torque can be realized.

Further, by adapting anisotropic ferromagnets to the ferromagnets of the rotary machine, e.g. by combining easy magnetizing axes 137 (144) of the ferromagnets 131 (142) with the magnetic flux paths of the magnetic circulation paths 170, the magnetic flux density that is higher than the isotropic ferromagnet is obtained, and the iron loss can be reduced.

Tenth Embodiment

Figure 41:
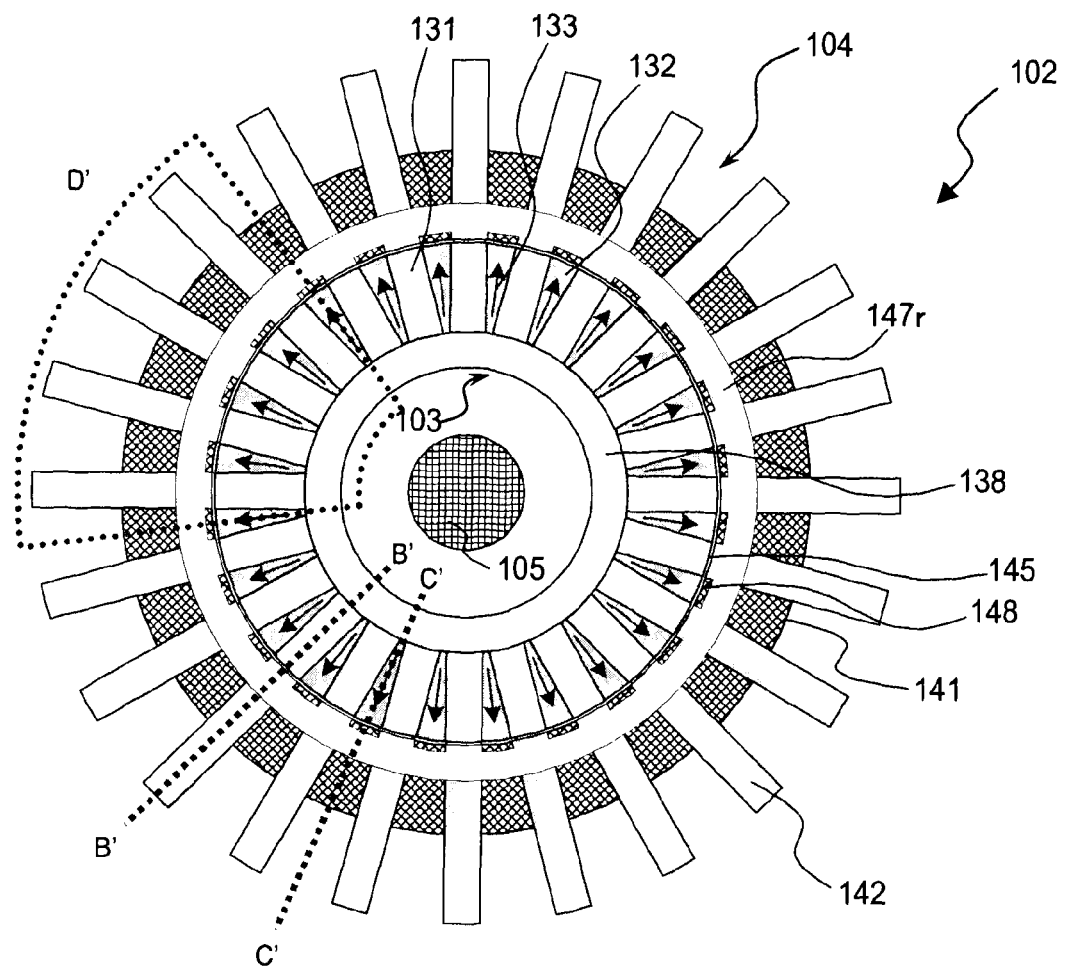
FIG. 41 is a cross-sectional view showing a configuration of a rotary component 102 according to a tenth embodiment.
Figure 43:
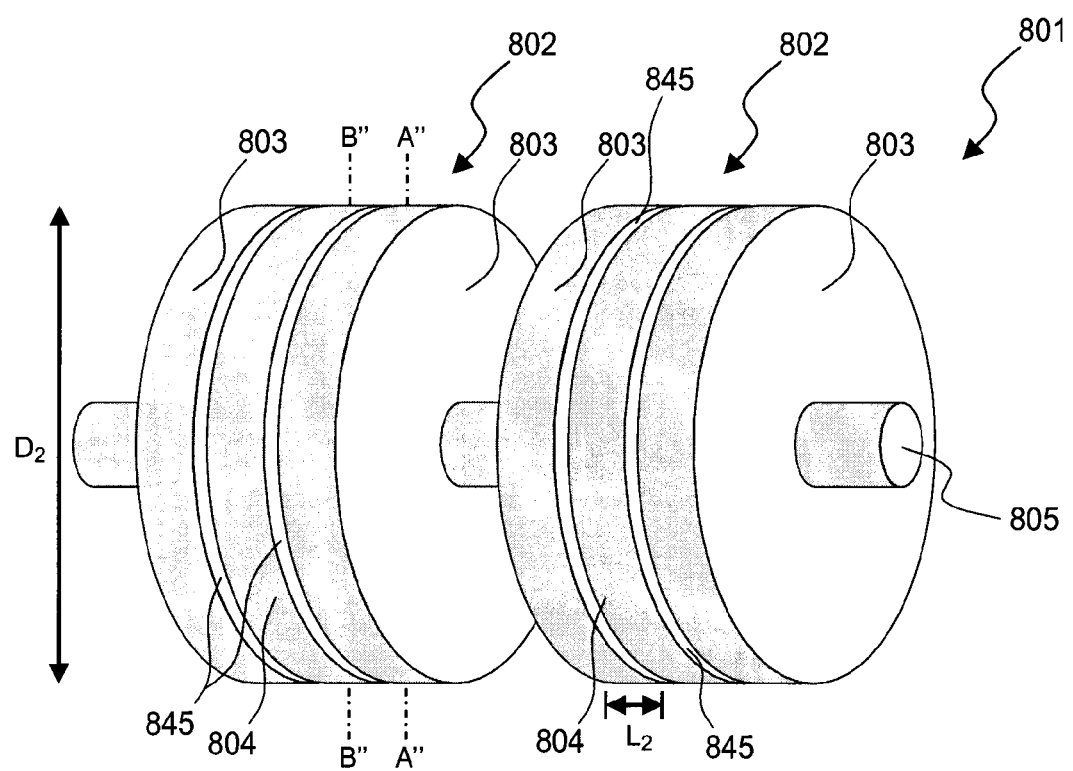
FIG. 43 is an overall view showing a configuration of a rotary machine 801 according to an eleventh embodiment.

FIGS. 41 to 42 are diagrams for explaining a configuration of a rotary machine 101 of a tenth embodiment. Although the basic configuration is the same as the rotary machine 101 of the ninth embodiment, it differs in that ferromagnets 142 and ferromagnets 147r of a stationary component 104 are attached by coming in contact. In FIG. 41, the ferromagnets 147r are ring shaped, and are arranged by coming in contact and being stacked in a direction different from the ferromagnets 142, however, these members do not have to be manufactured separately, and it is possible to drive in a similar principle even if they are made integrally by a cutting processing or a compression molding of a dust core, etc.

In this case, it is possible to significantly reduce a number of assembly processes. As the gap between a rotary component 103 and the stationary component 104, there are two types of a gap 145 and a gap 148 as shown in FIGS. 41 and 42. Magnetic circulation paths 170 are formed when current is applied to a winding 141, however, in the aforementioned paths, most of magnetic flux flows in concentration via the gap 145 between the ferromagnet 147r and a ferromagnet 131, and the behavior thereof is substantially the same as the case with the rotary machine 101 of the ninth embodiment. On the other hand, although most of flux of a magnetic field generating section 132 (134) flows via the gap 145, however, it tends to flow via the gap 148 at a portion far away from the gap 145 on a surface of the magnetic field generating section 132 (134). Due to this, the rotary machine 101 of the tenth embodiment has higher permeance as seen from a magnetic field generating section 132 (134) side than the rotary machine 101 of the second embodiment, and strong magnetic fields can be generated. Similar to the rotary machine 101 of the ninth embodiment, the rotary machine 101 of the tenth embodiment has at least two types of driving components 102 in which the relative positional relationship of the rotary component 103 and the stationary component 104 differs. Due to this, torque can be controlled by modulating the proportion of the amount of current to be supplied to the windings 41 of the plurality of driving components 102. A relationship of driving force and current and matters related to driving control are basically the same as the first embodiment.

Note that, as shown in FIG. 42, the ferromagnets 147r preferably comprise concavo-convex patterns in the rotational direction on a side opposing the rotary component 103. Due to this, the effect unique to the present embodiment can surely be obtained.

Eleventh Embodiment

Figure 44:
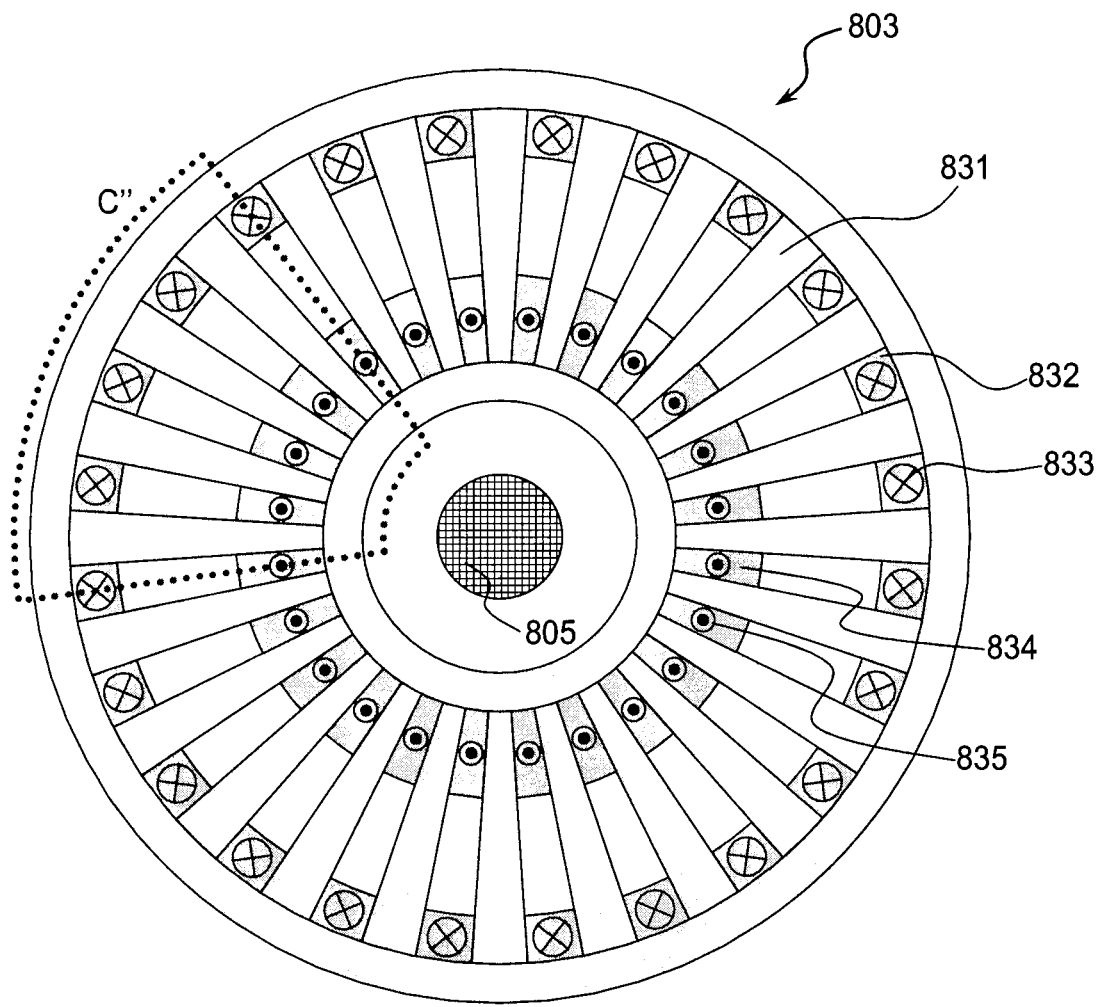
FIG. 44 is a cross-sectional view along A"-A" showing a configuration of a rotary component 803 of FIG. 43.
Figure 45:
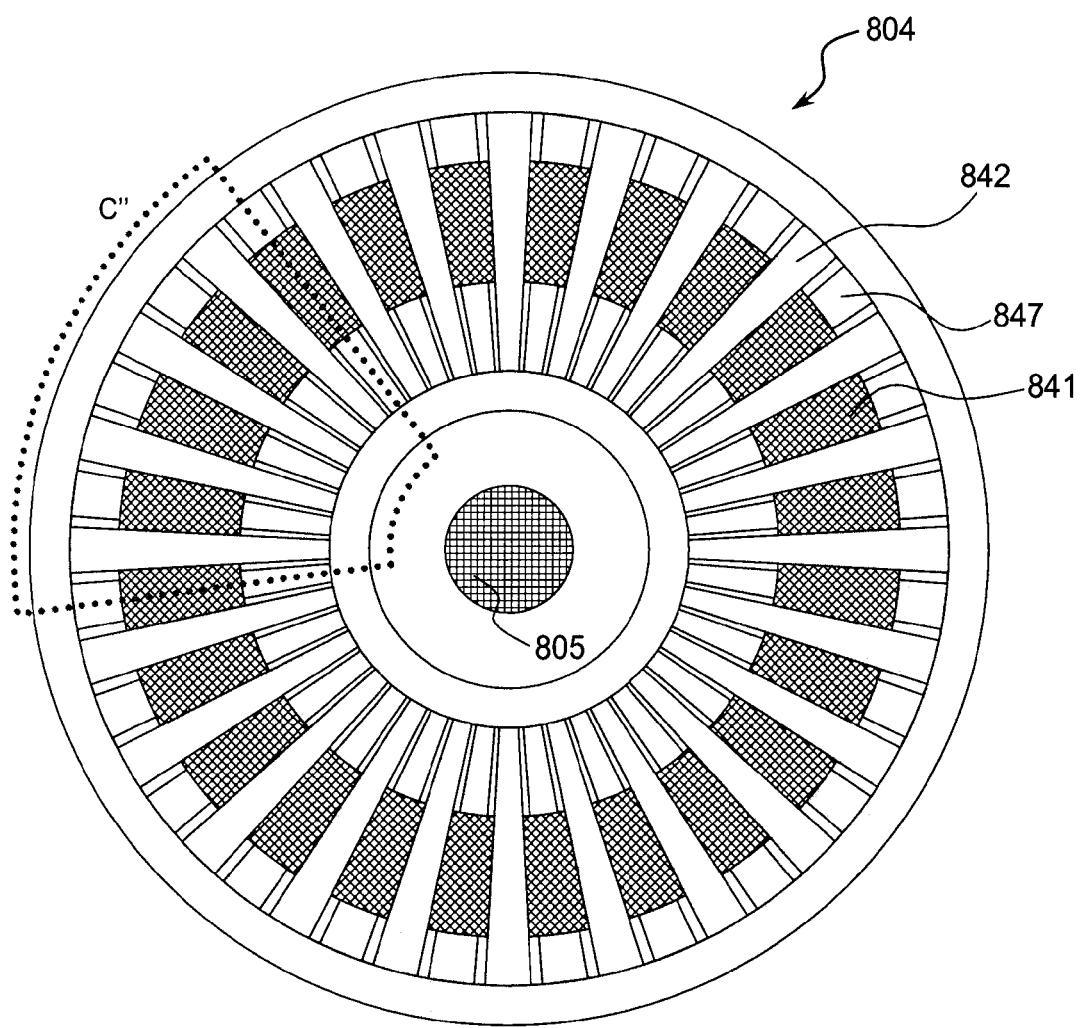
FIG. 45 is a cross-sectional view along B"-B" showing a configuration of a stationary component 804 of FIG. 43.

FIGS. 43 to 49 are views for explaining a configuration of a rotary machine 801 of an eleventh embodiment. Although the basic configuration is the same as the rotary machine 501 of the sixth embodiment, compared to the rotary machine 501, the rotary machine 801 differs in that a stationary component 804 is intervened between two rotary components 803. FIG. 44 is a view for explaining a configuration of the rotary components 803 of FIG. 43 seen from an A"-A" cross section. Although the basic configuration is the same as the rotary component 103 of the ninth embodiment, it differs in that a direction of magnetic fields by magnetic field generating sections 832 (834) is along a longitudinal direction of a rotational axis 805. FIG. 45 is a view for explaining a configuration of the stationary component 804 of FIG. 43 seen from a B"-B" cross section. It has the same configuration as the stationary component 104 of the aforementioned ninth embodiment in having ferromagnets 847 intervened between ferromagnets 842 surrounding a winding 841 and adjacent ferromagnets 842, and according to this, similar to intervening the ferromagnets 147 in the rotary machine 101, permeance in magnetic circulation paths 871 on the magnetic field generating section side is increased, where strong magnetic fields can be generated by the same magnetomotive force, and high torque can be obtained. FIG. 46B shows configuration of a region C" in FIGS. 44 and 45 arranged in the longitudinal direction of the rotational axis 805. The ferromagnets 847 intervened between the adjacent ferromagnets 842 are arranged in U-shapes similar to the ferromagnets 842 and in an opposite direction of the ferromagnets 842, and rotary components 803a and 803b are arranged symmetrically relative to the stationary component 804. According to this configuration, even in spaces between the adjacent ferromagnets 842, magnetic circulation paths 870b are formed between the ferromagnets 847 and the rotary component 803b by magnetic flux generated by exciting the wiring 841, where the magnetic flux can effectively be used without leaking it into the air, and further, it is also advantageous with respect to a degree of integration of the stationary component 804. Further, as shown in FIG. 47, even when rotary components 803a, 803b that are not in a symmetric structure relative to the stationary component 804 are configured, the leakage of the magnetic flux into the air is reduced similar to the case of FIG. 46, and at the same time a high integration of the stationary component 804 can be realized. From the structural difference of the two rotary components shown in FIG. 46 and FIG. 47, differences are exhibited in behaviors of cogging torque and force generated in the axial direction (vertical force). In the case of FIG. 46, reluctance torque that works on the rotary component 803a is toward the right side, and reluctance torque that works on the rotary component 803b is toward the left side. The two cancels one another, so the reluctance torque generated as a whole is small. On the other hand, in the case of FIG. 47, reluctance torque that works on both the rotary component 803a and the rotary component 803b are toward the right side, so the reluctance torque to be generated is large. If the reluctance torque is large, then the cogging torque also becomes large. Accordingly, a difference of the reluctance torque imposes influence as a difference in the cogging torque. Further, opposing areas of the ferromagnet 842 and a ferromagnet 813a as well as the ferromagnet 847 and a ferromagnet 813b are equal in the case of FIG. 47, so the forces generated in the axial direction completely cancels one another, however, since the aforementioned opposing areas is different in the case of FIG. 46, the force is generated in the axial direction. The force in the axial direction imposes influence on a retaining property of bearings. Accordingly, depending on the purpose, the combinations of the two rotary components 803 can selectively be used.

In FIG. 48, a configuration of a case in which two sets of the driving components 802, in which the rotary components 803 and the stationary components 804 shown in FIG. 46 are adapted, are adapted is shown. Here, the phase of all of the rotary components 803 of the two sets of the driving components 802 are the same, and the phase of the two sets of the stationary components 804 differs by 90°. Due to this, the torque can be controlled by applying two-phase current to windings 841a and 841b. Further, in the rotary component 803b of the driving component 802a and the rotary component 803c of the driving component 802b, the high integration is realized by commonly using a ferromagnet 838d. Further, similar to the rotary machine 201 of the third embodiment, in order to strengthen the magnetic fields of the magnetic circulation paths 871, the ferromagnets 838 may be substituted by magnetic field generating sections. In that case also, the permeance seen from the magnetic circulation paths 870 formed by the excitation of the windings 841 is not lowered, and by interacting with the strong magnetic fields of the magnetic circulation paths 871, the increase in the torque can be realized. FIG. 49 shows a configuration of a case in which two sets of the driving components 802, in which the rotary components 803 and the stationary component 804 shown in FIG. 47 are adapted, are adapted, and a property similar to configuration of the case of FIG. 48 can be obtained. These may be selectively be used depending on which of the cogging torque property and the bearing retaining property is to be considered important.

These embodiments are presented merely as examples, and do not intend to limit the scope of the claims. These embodiments are capable of being carried out in various other embodiments, and various abbreviations, replacements, and modification thereof can be made within a scope that does not go beyond the essence of the invention. For example, in the automobile of the eighth embodiment, rotary machines of other embodiments as substitute for the rotary machine of the first embodiment may be used.

Further, these embodiments and modifications thereof are included in the scope and essence of the invention, and at the same time, are included in the invention described in the claims and a scope of equivalents thereof.

What is claimed is:

1. A transverse flux machine comprising:
a winding wound in a rotational direction;
a stationary component in which first ferromagnets and second ferromagnets surrounding a part of the winding are arranged in the rotational direction;
a rotor capable of rotating around a rotational axis; and
a rotary component opposing the stationary component and attached to the rotor,
wherein the rotary component includes
third ferromagnets opposing the first ferromagnets;
fourth ferromagnets opposing the second ferromagnets;
first magnetic field generating sections intervened between the third ferromagnets and the fourth ferromagnets; and
second magnetic field generating sections intervened between the third ferromagnets and the fourth ferromagnets, the second magnetic field generating sections opposing the first magnetic field generating sections along a direction of the rotational axis,
wherein the first magnetic field generating sections and the second magnetic field generating sections generate magnetic fields from an opposing surface of the rotary component toward an opposing surface of the stationary component, and directions of the magnetic fields are opposite of one another.

2. The transverse flux machine according to claim 1, comprising:
a plurality of sets of the rotary component and the stationary component; and
a plurality of sets having a different relative positional relationship of the rotary component and the stationary component in the rotational direction.

3. The transverse flux machine according to claim 1, further comprising:
a fifth ferromagnet attached to at least one of the third ferromagnets, the fourth ferromagnets, the first magnetic field generating sections and the second magnetic field generating sections, at a surface of the rotary component not opposing the stationary component.

4. The transverse flux machine according to claim 1, further comprising:
a third magnetic field generating section and a fourth magnetic field generating section attached to at least one of the third ferromagnets, the fourth ferromagnets, the first magnetic field generating sections and the second magnetic field generating sections, at a surface of the rotary component not opposing the stationary component, and arranged so as to generate magnetic fields in a direction that strengthens magnetic fields in the respective ferromagnets of the third ferromagnets and the fourth ferromagnets.

5. The transverse flux machine according to claim 1, wherein
the stationary component comprises fifth ferromagnets intervened between the first ferromagnets and the second ferromagnets.

6. The transverse flux machine according to claim 5, wherein
two pieces of the rotary components are arranged so as to intervene the stationary component concentrically relative to the rotational axis,
one of the rotary components interacts with a magnetic field that passes through the first ferromagnets and the second ferromagnets by an excitation of the winding, and
the other of the rotary components interacts with a magnetic field that passes through the fifth ferromagnets by the excitation of the winding.

7. The transverse flux machine according to claim 1, wherein
the stationary component comprises fifth ferromagnets intervened between the first rotary component and one of the first ferromagnets and the second ferromagnets, and include a concavo-convex pattern on a side opposing the rotary component.

8. The transverse flux machine according to claim 7, wherein
two pieces of the rotary components are arranged so as to intervene the stationary component concentrically relative to the rotational axis,
one of the rotary components interacts with a magnetic field that passes through the first ferromagnets and the second ferromagnets by an excitation of the winding, and
the other of the rotary components interacts with a magnetic field that passes through the fifth ferromagnets by the excitation of the winding.

9. The transverse flux machine according to claim 7, wherein
at least one of the first ferromagnets to the fifth ferromagnets includes a ferromagnet having magnetic anisotropy in part or entirety thereof.

10. The transverse flux machine according to claim 1, further comprising:
a measuring section that measures a rotational angle around the rotational axis of the rotary component; and
a controlling section that controls an amount of current to flow in the winding based on a signal from the measuring section.

11. A vehicle comprising:
a transverse flux machine that comprises
a winding wound in a rotational direction;
a stationary component in which first ferromagnets and second ferromagnets surrounding a part of the winding are arranged in the rotational direction;
a rotor capable of rotating around a rotational axis; and
a rotary component opposing the stationary component and attached to the rotor,
wherein the rotary component comprises:
third ferromagnets opposing the first ferromagnets;
fourth ferromagnets opposing the second ferromagnets;
first magnetic field generating sections intervened between the third ferromagnets and the fourth ferromagnets; and
second magnetic field generating sections intervened between the third ferromagnets and the fourth ferromagnets, the second magnetic field generating sections opposing the first magnetic field generating sections along a direction of the rotational axis,
wherein the first magnetic field generating sections and the second magnetic field generating sections generate magnetic fields from an opposing surface of the rotary component toward an opposing surface of the stationary component, and directions of the magnetic fields are opposite of one another.

12. The vehicle according to claim 11, the transverse flux machine further comprising:
a measuring section that measures a rotational angle around the rotational axis of the rotary component; and
a controlling section that controls an amount of current to flow in the winding based on a signal from the measuring section.

13. The vehicle according to claim 12, further comprising:
a power source, and an inverter that inverts electric power outputted from the power source,
wherein the transverse flux machine is operated by the electric power inverted by the inverter.

14. The vehicle according to claim 12, further comprising:
an internal combustion engine, a generator that converts driving power outputted from the internal combustion engine to electric power;
an inverter that inverts the electric power generated by the generator; and
a power source that is charged by the electric power inverted from the inverter,
wherein the transverse flux machine is operated by the electric power outputted from the power source.

\* \* \* \* \*